United States Patent
Huschke et al.

(10) Patent No.: US 10,009,876 B2
(45) Date of Patent: Jun. 26, 2018

(54) DETERMINING AN ADAPTED RESOURCE PATTERN FOR AN ACCESS NODE

(71) Applicant: Telefonaktiebolaget LM Ericsson (publ), Stockholm (SE)

(72) Inventors: Jörg Huschke, Aachen (DE); Laetitia Falconetti, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 14/912,122

(22) PCT Filed: Aug. 15, 2013

(86) PCT No.: PCT/EP2013/067077
§ 371 (c)(1),
(2) Date: Feb. 15, 2016

(87) PCT Pub. No.: WO2015/022029
PCT Pub. Date: Feb. 19, 2015

(65) Prior Publication Data
US 2016/0205666 A1    Jul. 14, 2016

(51) Int. Cl.
*H04W 72/04*    (2009.01)
*H04W 72/00*    (2009.01)
(Continued)

(52) U.S. Cl.
CPC .......... *H04W 72/04* (2013.01); *H04W 72/00* (2013.01); *H04W 28/08* (2013.01); *H04W 28/26* (2013.01); *H04W 92/20* (2013.01)

(58) Field of Classification Search
CPC ..... H04W 72/04; H04W 72/00; H04W 28/08; H04W 28/26; H04W 92/20
See application file for complete search history.

(56) References Cited

U.S. PATENT DOCUMENTS

| 2010/0267408 A1* | 10/2010 | Lee | H04W 52/243 |
| | | | 455/509 |
| 2011/0183679 A1* | 7/2011 | Moon | H04W 72/082 |
| | | | 455/450 |

(Continued)

FOREIGN PATENT DOCUMENTS

| WO | 2011090253 A1 | 7/2011 |
| WO | 2011095211 A1 | 8/2011 |

(Continued)

OTHER PUBLICATIONS

3GPP, "3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.5.0 (Jun. 2013), Jun. 2013, 1-144.

*Primary Examiner* — Zhiren Qin
*Assistant Examiner* — Harry H Kim
(74) *Attorney, Agent, or Firm* — Sage Patent Group

(57) ABSTRACT

A method for determining an adapted resource pattern to be applied by an access node (204a), the resource pattern comprising time-frequency resource units is described. The method is performed by the access node (204a) and comprises determining (229) information indicative of a resource usage of resources of the access node (204a) reserved for at least one terminal (206) servable by the access node (204a), and receiving (244), from at least one further access node (204b), information indicative of a resource usage of resources of the at least one further access node (204b) reserved for at least one further terminal servable by the at least one further access node (204b). The method also comprises determining (248) an adapted resource pattern to be applied by the access node (204a) based on the determined information in relation to the received information. Further, related methods for the at (Continued)

least one further access node, the related access node and the related at least one further access nodes, a communication system, computer programs and computer program products are described. Therefore an optimally balancing of a throughput of terminals servable by an access node and a throughput of other terminals servable by at least a further access node can be enabled in a coordinated, dynamic and efficient way.

4 Claims, 8 Drawing Sheets

(51) Int. Cl.
  *H04W 28/08* (2009.01)
  *H04W 28/26* (2009.01)
  *H04W 92/20* (2009.01)

(56) References Cited

U.S. PATENT DOCUMENTS

| 2015/0208410 A1* | 7/2015 | Koutsimanis | H04W 24/10 370/252 |
| 2015/0327265 A1* | 11/2015 | Lee | H04W 72/0446 370/311 |
| 2016/0014592 A1* | 1/2016 | Park | H04W 36/04 370/331 |

FOREIGN PATENT DOCUMENTS

| WO | 2012079604 A1 | 6/2012 |
| WO | 2014021762 A1 | 2/2014 |

* cited by examiner

DETERMINING AN ADAPTED RESOURCE PATTERN FOR AN ACCESS NODE

TECHNICAL FIELD

The invention relates to a determination of an adapted resource pattern to be applied by an access node, and corresponding methods, access nodes, computer programs, computer program products and a corresponding communication system.

BACKGROUND

A cellular network may comprise multiple access nodes each of which serving one or more terminals. For example, a heterogenous Long Term Evolution (LTE) radio access network comprises access nodes embodied as macro eNodeBs serving a larger serving area compared to access nodes embodied as pico eNodeBs serving a small serving area typically located within the serving area of one macro eNodeB. An association between a terminal and its serving access node may be based on a signal strength of a downlink signal, for example a Reference Signal Received Power (RSRP) in LTE.

Interference effects may arise for a terminal located in a serving area of an access node, since on the one hand a measured signal strength of a signal from the serving access node and therefore a signal quality of the signal decreases with an increasing distance from the serving access node and on the other hand a signal strength of another signal causing interference from another non serving access node increases with the distance from the serving access node. In the above example of LTE, a terminal farer away from its serving pico eNodeB may experience a negative signal quality in terms of a Signal to Interference and Noise Ratio (SINR) determined in a logarithmic domain, since an interference from a macro eNodeB may be stronger than a useful signal from the pico eNodeB. Accordingly, an achievable transmission rate and throughput of such a terminal may be reduced. A failure of a radio link between the terminal and the serving access node may even occur, if the terminal might not be longer able to properly receive control information from the serving access node, for example on the control channel defined in LTE. The aforementioned interference effects may even be worse in a case in which a serving area extension mechanism can be applied for the access node. For example, in a Cell Range Extension (CRE) approach known in LTE, a bias is added to the signal strength of a signal from a pico eNodeB such that a terminal measuring the signal strength may experience the pico eNodeB as best serving access node even at locations outside of the usual serving area of the pico eNodeB. Terminals in the extended serving area range may be particularly subject to interference caused by non-serving access nodes.

In order to address the above interference problems, techniques for interference protection may be used in the cellular network. One technique employs a resource pattern to be applied by an access node which may comprise first resource units reserved for terminals servable by the access node and second resource units reserved for other terminals servable by another access node. For example, in Third Generation Partnership Project (3GPP) for example TS36.423 V11.5.0 (2013-06), a time-frequency resource pattern with Protected Sub-Frames (PSF) is defined for LTE. Such a PSF resource pattern comprises first resource units usable by terminals servable by a macro eNodeB, and second resource units usable by terminals servable by one or more pico eNodeBs. The macro eNodeB may semi-statically not perform Physical Downlink Shared Channel (PDSCH) and Physical Downlink Control Channel (PDCCH) transmission in the second resource units reserved for the terminals servable by the one or more pico eNodeBs such that the pico eNodeBs may use these resources to perform a correct interference measurement and schedule those terminals which would otherwise be strongly affected by interference from the macro eNodeB when not using the described resource pattern.

However, applying an interference protection mechanism such as the above described resource pattern may reduce a throughput of terminals served by the serving access node, since an amount of resources in the resource pattern usable by terminals served by the serving access node may be limited owing to a definition of the second resource units in the resource pattern.

The above situation may even be worse in a cellular network scenario comprising multiple adjacent access node each of which applying its own resource pattern, since a terminal served by an access node and using the second resource units of the resource pattern defined by another access node may experience interference from a further adjacent access node applying a different resource pattern compared to the resource pattern of the another access node. Having defined an identical resource pattern by each adjacent access node may also induce unnecessary resource restrictions for terminals served by one specific access node for a specific traffic situation in that the amount of resources usable by terminals of a particular access node would be even more reduced.

SUMMARY

It is an object of the present invention to provide measures for optimally balancing a throughput of terminals servable by an access node and a throughput of other terminals servable by at least a further access node in a coordinated, dynamic and efficient way. It is another object of the present invention to provide corresponding methods, nodes, computer programs, computer program products and a corresponding communication system.

According to an exemplary aspect of the invention, a method for determining an adapted resource pattern to be applied by an access node is provided. The resource pattern comprises time-frequency resource units. The method is performed by the access node and comprises determining information indicative of a resource usage of resources of the access node reserved for at least one terminal servable by the access node. The method comprises receiving, from at least one further access node, information indicative of a resource usage of resources of the at least one further access node reserved for at least one further terminal servable by the at least one further access node, and determining an adapted resource pattern to be applied by the access node based on the determined information in relation to the received information.

According to another exemplary aspect of the invention, a method for an access node to be used in association with determining an adapted resource pattern to be applied by a further access node is provided. The resource pattern comprises time-frequency resource units. The method is performed by the access node and comprises determining information indicative of a potential throughput perceived by at least one terminal served by the access node, and sending, to the further access node, the determined information.

According to another exemplary aspect of the invention, a method for an access node to be used in association with determining an adapted resource pattern to be applied by a further access node is provided. The resource pattern comprises time-frequency resource units. The method is performed by the access node and comprises determining information indicative of a resource usage of resources of the access node reserved for at least one terminal servable by the access node. The determined information indicates that the access node is not serving a terminal. The method comprises sending, to the further access node, the determined information.

According to another exemplary aspect of the invention, an access node for determining an adapted resource pattern to be applied by the access node is provided. The resource pattern comprises time-frequency resource units. The access node comprises at least one processor and a memory comprising instructions executable by the at least one processor. Thereby the access node is adapted to determine information indicative of a resource usage of resources of the access node reserved for at least one terminal servable by the access node, and receive, from at least one further access node, information indicative of a resource usage of resources of the at least one further access node reserved for at least one further terminal servable by the at least one further access node. The access node is adapted to determine an adapted resource pattern to be applied by the access node based on the determined information in relation to the received information.

According to another exemplary aspect of the invention, an access node adapted to be used in association with determining an adapted resource pattern to be applied by a further access node is provided. The resource pattern comprises time-frequency resource units. The access node comprises at least one processor and a memory comprising instructions executable by the at least one processor. Thereby the access node is adapted to determine information indicative of a potential throughput perceived by at least one terminal served by the access node, and send, to the further access node, the determined information.

According to another exemplary aspect of the invention, an access node adapted to be used in association with determining an adapted resource pattern to be applied by a further access node is provided. The resource pattern comprises time-frequency resource units. The access node comprises at least one processor, and a memory comprising instructions executable by the at least one processor. Thereby the access node is adapted to determine information indicative of a resource usage of resources of the access node reserved for at least one terminal servable by the access node. The determined information indicates that the access node is not serving a terminal. The access node is adapted to send, to the further access node, the determined information.

According to another exemplary aspect of the invention, a communication system for determining an adapted resource pattern to be applied by an access node of the communication system is provided. The communication system comprises the above described access node for determining the adapted resource pattern and/or the above described access node to be usable in association with the determination of the adapted resource pattern.

According to another exemplary aspect of the invention, a computer program is provided. The computer program, when being executed by at least one processor of an access node, causes the access node to perform a method described above.

According to another exemplary aspect of the invention, a computer program product is provided. The computer program product comprises program code to be executed by at least one processor of an access node, thereby causing the access node to perform a method described above.

Further embodiments are described in the dependent claims.

DETAILED DESCRIPTION OF EMBODIMENTS

Figure 1:
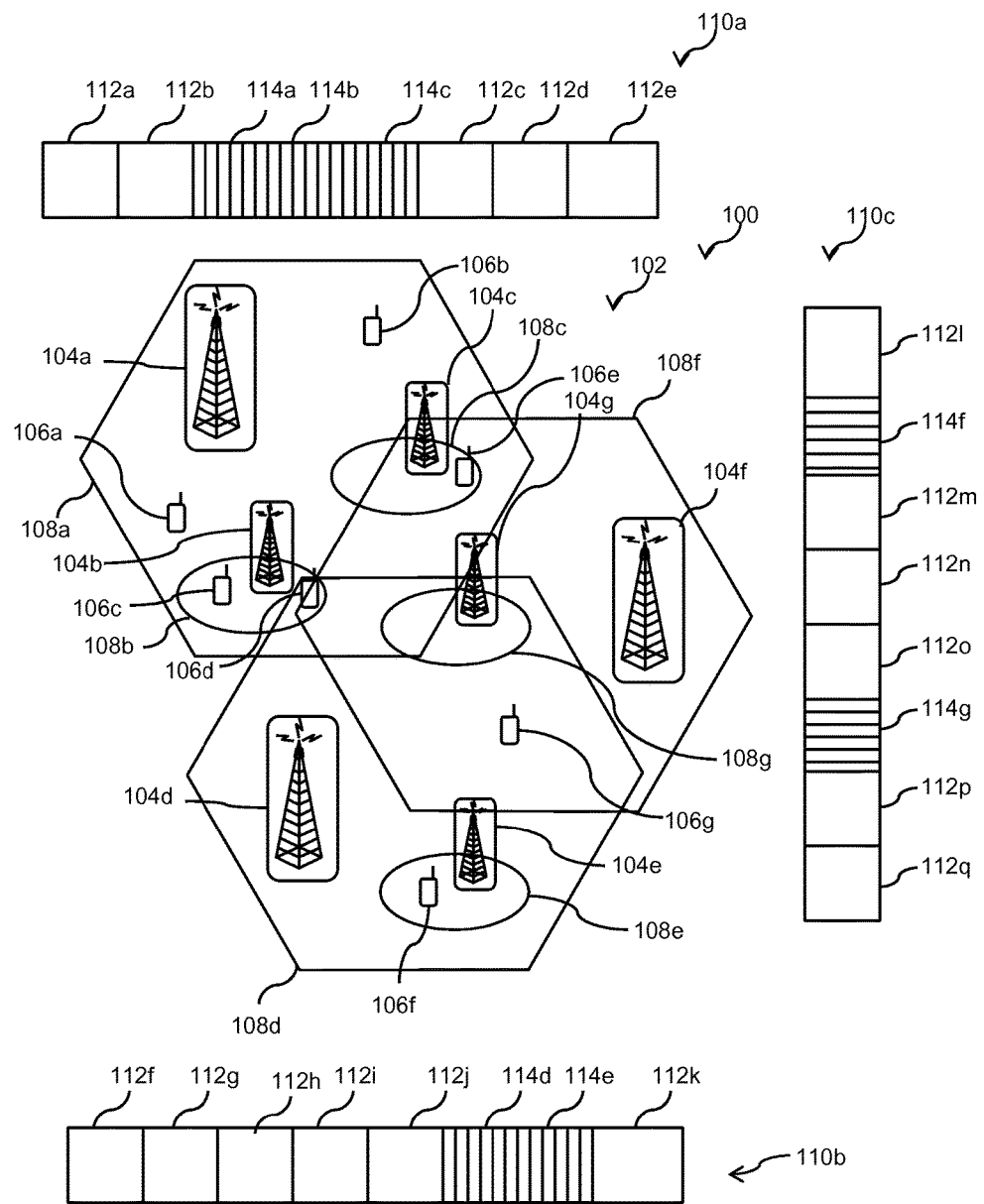
FIG. 1 is a block diagram illustrating an exemplary communication scenario usable in accordance with embodiments of the invention.

It is noted that similar or identical elements or steps in the figures are referenced by the same reference numeral or by reference numerals which are only different within the first digit.

In the following, concepts according to the exemplary aspects of the invention will be explained in more detail.

Within the context of this application, the term "information indicative of a parameter" may particularly denote information indicating the parameter or may denote information indicating a different parameter from which the information indicative of the parameter can be deduced. Further, the invention will be described with reference to parameters rather than values of the parameter, in order to facilitate the legibility of this application.

According to the exemplary aspects of the invention, an access node of a communication network, for example a cellular network, may currently apply a resource pattern. Further, the access node may serve one or more terminals located in its serving area. A resource pattern applicable by the access node may comprise time-frequency resource units which may be reserved for one or more terminals servable by the access node. In this respect, terminals servable by the access node may correspond to terminals currently be served or terminals to be served in future. At least one further access node of the communication network or multiple further access nodes for the communication network may each serve one or more further terminals located in a serving area of the respective at least one further access node. Each access node may determine information indicative of a resource usage of resources of the respective access node reserved for the respective one or more terminals servable by the respective access node. The one or more further access nodes may send its determined information to the access node which in turn may determine an adapted resource pattern to be applied by the access node by relating the determined information to the received information.

Therefore an adaption or update of the resource pattern to be applied by the access node may be accomplished in a coordinated way between the involved access nodes and may be performed optimally in view of a varying traffic load generated by the one or more terminals served by the respective access node, since the involved access nodes may provide input indicative of the resource usage of the resources thereof for the determination of the adapted resource pattern. Further, the above described adaption of the resource pattern of the access node may be dynamically performed, since the step of determining may be automatically triggered upon having successfully determined the information and having successfully received the information. Further, each access node may individually determine its adapted resource pattern in a decentralized way within the communication system such that adapted resource pattern determined by different access nodes may differ from one another if useful in the communication network. The adaption of the resource pattern may be also efficiently performed in that a resource consumption for transferring the determined information and information about a currently applied resource pattern to a master network component adapted to determine the adapted resource pattern may be avoided.

Next, further exemplary embodiments of the method performed by the access node will be explained. These embodiments also apply to the other method, the access nodes, the communication system, the computer programs and the computer program products.

In the following, the method will be described with reference to at least one element, for example at least one further access node. The method may be equally applicable to multiple, i.e. more than one, element.

In particular, the access node may potentially interfere the at least one further terminal and/or the at least one further access node may potentially interfere the at least one terminal. In this respect, the term "potential interference" may particularly denote that an interference of a signal to be received by a terminal may currently happen, may have previously happened and may have therefore been reported to have occurred in the communication network or may be expected to likely happen because of a location of a terminal with respect to the potentially interfering access node. Hence, the determination of the adapted resource pattern may be triggered by a potential interference received by the at least one terminal served by the one or both of the respective access nodes, i.e. the access node and/or the at least one further access node. An interference level as experienced by the respective at least one terminal may be based on measuring, by the terminal, a signal strength of a signal, for example an RSRP. The measured signal strength can be reported to the respective serving access node by sending information related to the latter, for example in a handover measurement report.

In particular, the method may further comprise applying the adapted resource pattern by the access node and/or sending information about the adapted resource pattern to the at least further access node.

In particular, the method may further comprise sending the determined information to the at least one further access node such that the at least one further access node may also be enabled to determine an adapted resource pattern to be applied by the at least one further access node. Since the access node and the at least one further access node may base the determination of their adapted resource pattern on the same information, the adapted resource pattern determined by both access nodes may likely represent optimum resource pattern which could be determined by one master node based on jointly considering input information from the involved access nodes.

In particular, the step of receiving the information and the step of determining the information may be performed in an arbitrary sequence to one another or simultaneously to one another.

In particular, the received information and the determined information may relate to an identical type of parameter such that the determination of the adapted resource pattern may be easily performed without the necessity of recalculating by the access node the determined information or the received information into a common metric.

In particular, the steps of the method may be performed regularly, for example repeatedly at expiration of a predetermined time interval, based on a request of one involved access node or terminal or upon a detected change in a resource usage of one of the involved nodes.

A resource pattern of, i.e. applicable by, the access node may comprise first resource units and/or second resource units, and the first resource units may be reserved for the at least one terminal servable by the access node and the second resource units may be reserved for the at least one further terminal servable by the at least one further access node. Hence, the determination of the adapted resource pattern of the access node can be performed in a communication scenario in which the same resource pattern may be used by the access node and the at least one further access node. For example, the access node may be embodied as a macro eNodeB, and the at least one further access node may be embodied as a pico eNodeB in a LTE radio access network. In an alternative embodiment, the access node may be embodied as a pico eNodeB adapted to determine the resource pattern and to serve at least one terminal of a closed subscriber group and further terminals. In this configuration, the at least one further access node may be embodied as another macro eNodeBs, pico eNodeBs and/or as femto eNodeBs.

A resource pattern of, i.e. applicable by, the access node may comprise first resource units and/or second resource units, and the first resource units may be reserved for the at least one terminal servable by the access node and the second resource units may be reserved for at least one another terminal being not servable by the access node and by the at least one further access node, and the one or more further access nodes may apply a further resource pattern. Therefore the above described determination of the adapted resource pattern by the access node may be also applicable in a communication scenario in which adjacent or neighboring access nodes of an equivalent type, for example with respect to an allocation of resource units and scheduling terminals, may provide input for the determination of the adapted resource pattern. For example, the access node may be embodied as a macro eNodeB, and the one or more further access nodes may be also embodied as a neighboring macro eNodeB.

In particular, the above described embodiments related to the applicable communication scenario may be beneficially combined in that the access node may receive the information from at least a first access node whose served one or more terminals may use the second resource units of a resource pattern defined by the access node, and further information from at least a second access node having an own resource pattern defined. This communication scenario may relate to at least two marco eNodeBs and at least one pico eNodeB.

In particular, the resource pattern may exclusively comprise the first resource units and/or the second resource units, hence no third resource units.

In particular, a resource unit of the resource pattern may be defined by a fixed transmission time, for example as a sub-frame, by a fixed transmission frequency band, for example as a sub-band, or may be defined by a fixed transmission time and fixed transmission frequency band, for example as a Physical Resource Block (PRB).

In particular, the resource pattern may be defined in accordance with the above described interference protection mechanism, in which the second resource units may be embodied as protected resource units subject to low or no interference from the access node determining the resource pattern. For example, the resource pattern may be a PSF pattern, as seen from the perspective of a pico eNodeB, or as an Almost Blank Sub-frame (ABS) pattern, as seen from a perspective of a macro eNodeB.

The information indicative of the resource usage may be indicative of a potential throughput perceived by the respective at least one terminal, particularly all terminals, served by the respective access node, hence the access node and the at least one further access node. The potential throughput may therefore represent a direct measure for a predicted efficiency level of a usage of resources or resource units in the resource pattern based on which the adapted resource pattern can be easily determined.

In particular, the potential throughput may be measured in a utility metric, in order to take into account a return of an allocation of resources to the at least one terminal to the communication network. For example, the applied utility metric may be based on a logarithmic function with the potential throughput being an input parameter of the function.

The potential throughput perceived by the respective at least one terminal, particularly by all terminals, may be related to, particularly all, potential combinations of at least one potential adapted resource pattern of the respective access node with at least one potential adapted resource pattern of at least one another access node potentially interfering the respective at least one terminal of the respective access node. Therefore the determination of the adapted resource pattern can be performed in an accurate way in view of various degrees of freedom in the underlying communication network. It is noted that the potential throughput per each terminal served by the respective access node may arise from different potentially interfering access nodes.

A total amount of resource units of the resource pattern applicable by the respective access node may be fixed, and the amount of second resource units of one of the at least one potential adapted resource pattern of the respective access node may coincide with, may be decreased by at most a predetermined amount of second resource units compared to or may be increased by at most a predetermined amount of second resource units compared to the amount of second resources of the resource pattern currently applied by the respective access node. Since the total amount of resource units of the resource pattern may be calculated as a sum of the first resource units and the second resource units, the amount of the first resource units of the potential adapted resource pattern may correspondingly change with the changed amount of second resource units. Hence, the potential adapted resource pattern may be determined on a realistic approach by the respective access node determining the potential throughput in that it may be assumed that the currently applied resource pattern may remain unchanged or may be changed within a limited degree of freedom with respect to a distribution between the first and second resource units. Accordingly, calculation and therefore processing complexity with respect to determining the information indicative of the potential throughput may be decreased to an acceptable limit.

In particular, the predetermined amount of second resource units added to the currently applied resource pattern may be identical to the predetermined amount of second resource units removed from the currently applied resource pattern. The amount of second resource units in a potential adapted resource pattern may be increased or decreased in integer steps of one or more second resource units. The predetermined number may correspond to five, particularly to three, further particularly to one, with the calculation and processing complexity beneficially decreasing with the number of potential combinations of potential adapted resource pattern of the access node and of the at least one another access node.

The information indicative of the resource usage may be comprised in a matrix, and a first dimension of the matrix may be associated with the at least one potential adapted resource pattern of the respective access node and at least one another dimension of the matrix may be associated with at least one potential adapted resource pattern of the at least one another access node potentially interfering the respective at least one terminal served by the respective access node. The step of determining the adapted resource pattern may comprise matrix-based summing the received information and the determined information, and selecting a matrix element having a highest value. The adapted resource pattern may correspond to the potential adapted resource pattern of the access node associated with the selected matrix element. Hence, each access node may be associated with one different matrix dimension and a number of dimensions of the matrix may therefore correspond to 1+N with N equaling to a number of potentially interfering another access nodes experienced for the at least one terminal, particularly for all terminals, served by the respective access node. Pre-processing and arranging the respective information for each combination of the at least one potential adapted resource pattern of the access node and the at least one potential adapted resource pattern of the at least one another access node in a matrix element-wise way may facilitate the step of determining the adapted resource pattern of the access node. In this respect, signaling the information from the at least one further access node to the access node and/or processing of the received information and the determined information during the step of determining the adapted resource pattern may be easily and efficiently performed.

The step of determining the adapted resource pattern may further comprise, prior to the step of selecting, summing, along the at least one another dimension, particularly along all another dimensions, matrix elements associated with the respective at least one another access node. Hence, the matrix elements arranged along one another dimension and being associated with different potential adapted resource patterns of the associated another access node are summed per one potential adapted resource pattern of the access node such that an element reduction of the matrix elements and also a dimension reduction of the matrix may be accomplished. Therefore the determination of the adapted resource pattern may be performed in a robust way, since the determination may be less sensitive to the one or more assumed potential adapted resource pattern of the at least one another access node.

In particular, the method may further comprise receiving, from the at least one further access node, information relating to a content of the first dimension and the at least one another dimension, particularly of all another dimensions, of the matrix. Each dimension of the matrix may be associated with an access node, i.e. the at least one further access node and the at least one another access node potentially interfering the at least one further terminal served by the at least one further access node. The content of a dimension may relate to the information which access node may be associated with or correspond to this dimension. The content may also relate to a number of and an order or sequence of the one or more potential resource pattern of the respective access node with which the dimension of the matrix is associated. The aforementioned information relating to the number and sequence of the one or more potential adapted resource pattern might be not necessary in a case in which the access node, particularly each involved access node, may comprise a, particularly identical, pre-configuration relating to a knowledge about the number and the order of the one or more potential adapted resource pattern to be part of the received matrix. The information relating to the content may be received prior to, subsequent to or simultaneously, particularly in one message, with the matrix.

In particular, the access node may use inherent information about the content of the dimensions of its determined matrix in the step of determining the adapted resource pattern.

The step of determining the information indicative of the resource usage may comprise determining the at least one potential adapted resource pattern of the access node and the at least one potential adapted resource pattern of the at least one another access node potentially interfering the at least one terminal served by the access node.

In particular, the at least one potential adapted resource pattern of the at least one another access node may be determined based on a currently applied resource pattern of the respective another access node. Information about the currently applied resource pattern of the another access node may be received from the respective another access node, for example in a X2 signaling exchange type message.

In the at least one potential adapted resource pattern of the one of the respective access nodes having an increased amount of second resource units, a second resource unit may be added at an in time and/or frequency seen first usable location in the currently applied resource pattern of the one of the respective access nodes, if the currently applied resource pattern of the one of the respective access nodes may be free of second resource units. In this respect, a with respect to time first resource unit in the resource pattern may relate to a resource unit having a smallest time with respect to a resource pattern repetition period. A with respect to frequency first resource unit in the resource pattern may relate to a resource unit having a smallest frequency with respect to frequencies defined in the resource pattern. Hence, an initialization of the determination of the potential adapted resource pattern may be easily performed. In particular, if the currently applied resource pattern of at least two of the respective access nodes may be free of second resource units, the second resource unit in both potentially adapted resource patterns may be added at mutually different or disjunctive locations. Therefore a high potential throughput of the at least one terminal can be expected, since the same second resource unit may be only assigned in one potential adapted resource pattern.

Additionally or alternatively, in the at least one potential adapted resource pattern of the respective access node having an increased amount of second resource units, a second resource unit may be added adjacent to a second resource unit of the currently applied resource pattern of the respective access node. Therefore the potential resource pattern and therefore the adapted resource pattern may comprise a set of consecutive second resource units.

Additionally or alternatively, in the at least one potential adapted resource pattern having a decreased amount of second resource units, a second resource unit being adjacent to a first resource unit and adjacent to another second resource unit of the currently applied resource pattern may be removed. Hence, the potential resource pattern and the adapted resource pattern may comprise at least one set of consecutive first resource units.

If the predetermined amount of second resources may be equal to one, the second resource unit can be added to and/or removed from one of the end portions of the set of second resource units of the currently applied resource pattern. If the predetermined amount of second resources may be more than one, the second resource units can, if possible, be added to and/or removed from the two end portions of the set of second resource units of the currently applied resource pattern. Therefore a consecutive set of second resource units can gradually move through the adapted resource pattern during a course of several resource pattern update determinations. Mutually interfering access nodes having different resource pattern may be enabled to accomplish over time resource patterns in which the first resource units may be overlapping to a minimum extent.

In particular, one or more second resource units may be added in the potential adapted resource pattern of the two of the respective access nodes which may already comprise at least one second resource unit at mutually different or disjunctive locations such that a high throughput of the respective at least one terminal can be expected. For example, each resource pattern of multiple access nodes may comprise a sub-band in which resource units being defined as PRBs are included. The sub-bands of the multiple access nodes may be defined by adjacent frequency ranges. The PRB or PRBs of the second resource units may be arranged in these sub-bands at a possibly minimum time and frequency but at mutually different locations.

In particular, in the step of determining the potential adapted resource pattern, the number of resource units and/or the with respect to time and/or frequency specifically defined first resource units which may be additionally defined as a second resource unit and/or the number of resource units and/or the with respect to time and/or frequency specifically defined second resource units which may be removed from the resource pattern can be predetermined, particularly restricted, by the access node. Therefore the number of combinations can be beneficially reduced.

The step of determining the information indicative of the resource usage may comprise, for each combination of the at least one potential adapted resource pattern of the access node and of the at least one potential adapted resource pattern of the at least one another access node potentially interfering the at least one terminal served by the access node, determining, for the at least one terminal and a particular resource unit of the at least one potential adapted resource pattern of the access node, signal quality information indicative of a potential signal quality perceived by the at least one terminal, wherein the potential signal quality may consider interference from the at least one another access node, and determining, for the at least one terminal and based on the determined signal quality information, the potential throughput perceived by the at least one terminal in its usable resource units of the at least one potential adapted resource pattern of the access node depending on a scheduling scheme applied by the access node for scheduling a resource unit allocation for the at least one terminal. In particular, the signal quality may correspond to a signal S to interference I and noise N ratio R, which may be calculated according to R=S/(I+N) and may be denoted by SINR. For example, the signal strength may correspond to a terminal measured signal strength S of a signal from the serving access node, and the interference may correspond to a terminal measured signal strength I of a signal from the at least one another access node. In case of multiple interfering another access nodes the signal strengths $I_j$ caused by these another access nodes may be summed according to I=sum_j $\{I_j\}$, particularly in combination with using a suitable weighting factor $A_j$ for one or more of the signal strengths $I_j$, hence I=sum_j $\{I_j{*}A_j\}$. For example, the signal strength corresponds to a RSRP, and the signal quality to a SINR in LTE. Therefore a link quality, for example a channel quality in LTE, between the respective terminal and the access node may be considered in the determination of the adapted resource pattern.

In particular, the method may further comprise instructing the at least one terminal to only send the information about the terminal measured signal strength for those signal strength values being above a threshold defined by the access node and communicated to the at least one terminal. Alternatively or additionally, the method may further comprise comparing the signal strength received from the at least one terminal with a threshold value, and determining the potential signal quality for those signal strength values being above the threshold. In both options, the threshold may be predetermined by the access node and may be for example a noise level or a value being much lower than dominant signal strength values identified by the access node. Therefore a number of potentially interfering access nodes may be reduced, therefore limiting the number of potential combinations.

In particular, in the step of determining the potential throughput for the at least one terminal, those resource units may be considered or summed over whose associated potential signal quality may be above a predetermined threshold. This measure may avoid to schedule the terminal in a resource unit in which the signal quality may be too low and a scheduling grant, for example on a CCH, cannot be properly detected by the terminal.

In particular, the method may further comprise applying a utility metric to the potential throughput perceived by the at least one terminal in its usable resource units. The method may further comprise determining or forming a utility vector in which the potential throughput perceived by the at least one terminal in the usable resource units for all combinations of the potential adapted resource pattern of the access node and the at least one another access node may be combined. The method may further comprise determining or forming a utility matrix for the particular at least one terminal the combinations are mapped to dimensions of the utility matrix which is explained above. The step of determining the utility vector can be omitted and the utility matrix can be determined based on the potential throughput determined for the combinations.

In particular, the above embodiments relating to the potential signal quality, the potential throughput, the potential utility, the utility vector, and the utility matrix may be performed for all terminals served by the access node. The number of elements of the utility vector determined for two different terminals may vary depending on the number of potentially interfering access nodes experienced by the particular at least one terminal. Therefore a number of dimensions of a matrix calculated for a particular terminal served by the access node may be different from a number of dimensions of a matrix calculated for another terminal served by the same access node. In order to accomplish an identical number of dimension of these matrices, the access node may determine a total number of potentially interfering access nodes for all served terminals, and accordingly adapt the number of dimensions of the matrices determined per each terminal. Values of matrix elements in each matrix for which no interference from the at least one another access node may be detected by the particular one terminal may be set to the accordingly determined value without interference. The method may also comprise summing utility matrices calculated for all terminals served by the access node.

The information indicative of a resource usage may correspond to a current resource utilization of resources of the respective access node by the respective at least one terminal, particularly all terminals, served by the respective access node. In this respect, a current resource utilization may correspond to a ratio between resources currently used by the at least one terminal served by the respective access node and a total amount of resources available and usable by the at least one terminal. For example, in a case in which the access node may apply a resource pattern with first and second resource units and may exclusively use the first resource units of this resource pattern, the total amount of resources available by terminals served by this access node may equal the amount of resources in the first resource units. Therefore an easy approach for balancing a resource usage of resources of the further access node in comparison to the resource usage of resources of the at least one further access node may be enabled.

In particular, this aforementioned measure may be beneficially applied in a communication scenario in which at least one further terminal served by the at least one further access node may utilize the second resource units of the resource pattern applied by the access node for communication. Therefore it can be prevented that the further terminals served by the at least one further access node and utilizing only a small fraction of second resource units of the resource pattern would cause a high amount of second resources to be unnecessarily reserved for these terminals in the adapted resource pattern. In particular, the at least one further access node may determine whether a signal strength measured by a served terminal is above a threshold, and may identify the access node whose reported signal strength may be above the threshold, may represent a potential interfering access nodes which may be to be informed of a current resource utilization.

The step of determining the adapted resource pattern may comprise comparing the determined information and the received information with one another using a predetermined threshold, and the adapted resource pattern may be determined based on a result of the step of comparing. In particular, an algorithm associated with the comparison may consider an adapted resource pattern of the access node which may comprise an identical amount of second resource units compared to, an amount of second resource units decreased by at most a predetermined amount of second resource units compared to or an amount of second resource units increased by at most a predetermined amount of second resource units compared to the amount of second resources of the resource pattern currently applied by the access node. Embodiments described above for the potential adapted resource pattern related to the potential throughput may also apply for these adapted resource patterns. For example, if an absolute value of a difference between the determined information and the received information may be smaller than the predetermined threshold than the currently applied resource pattern may remain unchanged. In a case in which the difference between the determined information and the received information may be larger than the predetermined threshold, the adapted resource pattern to be selected may comprise a decreased amount of second resources. In a case in which the difference between the received information and the determined information may be above the predetermined threshold, the adapted resource pattern to be selected may comprise an increased amount of second resources.

The method may further comprise receiving, from at least another access node, another information indicating a resource usage of resources of the at least one another access node by at least one another terminal, particularly all another terminals, served by the at least another access node, and the step of determining the adapted resource pattern may comprise combining the further information with the determined information or with the received information, and the step of comparing may be performed on the combined information and the received information or on the determined information and the combined information. In this respect, combining information with another information may utilize a respective function. Such a function may be monotonically increasing with each resource utilization. The function may also correspond to, for example summing, averaging input values or taking a maximum. Averaging the resource utilization of various access nodes may enable to compare the received and determined information independently of a number of involved access nodes. Further, averaging the resource utilization may base the adapted resource pattern on an average terminal performance, and taking a maximum resource utilization may encourage a performance of a worst terminal. The another information may be similarly defined, hence relate to the same parameter, compared to the information and the further information. This measure may enable an easy approach for combining information of access nodes of an equivalent type prior to the step of comparing. Further, a coordination of resource pattern between access nodes adapted to determine its own adapted resource pattern and potentially interfering the terminals utilizing the second resource units of the resource pattern of one of these access nodes may be accomplished.

The determined information may indicate that the access node might not serve a terminal, and the determined adapted resource pattern may correspond to the resource pattern currently applied by the access node. Therefore a current communication capability of the access node may be maintained until the access node will serve a terminal in the future. In this respect, when applying the method over a longer period, the resource pattern of the access node may already comprise a reduced amount of resources reserved for its own servable terminals.

The determined information may indicate that the access node might not serve a terminal, and the step of determining the adapted resource pattern may comprise determining information indicative of a zero resource usage of a resources of the access node reserved for at least one terminal servable by the access node, and the step of matrix based summing or the step of comparing may be performed based on the determined information indicative of a zero resource usage. In the first option, the access node may construct a zero matrix for itself. In the second option, the access node may set its own resource utilization to zero. Therefore the above method steps may be equally applicable for the aforementioned scenario.

The received information may indicate that the at least one further access node might not serve a terminal, and the step of determining the adapted resource pattern may comprise determining information indicative of a zero resource usage of a resources of the at least one further access node reserved for at least one further terminal servable by the at least one further access node, and the step of matrix based summing or the step of comparing may be performed based on the determined information indicative of a zero resource usage. In the first option, the access node may construct a zero matrix for the at least one further access node. In the second option, the access node may set the resource utilization of the at least one further access node to zero. Therefore the above method steps may be equally applicable for the aforementioned scenario.

In particular, the method may further comprise determining whether the access node may serve a terminal, in order to properly perform the step of determining the information indicative of the resource usage. If the access node does not serve a terminal, the step of determining the information indicative of the resource usage may comprise selecting the information indicating that the access node might not serve a terminal.

Referring to FIG. 1, a communication scenario in accordance with the above described exemplary aspects of the invention will be described in more detail. A communication system 100 is part of a cellular network and comprises a radio access network 102 formed by a plurality of access nodes 104a-104g, each of which serving one or more terminals 106a-106g located in a serving area 108a-108g of the respective access node 104a-104g. For example, the radio access network 102 is embodied as a heterogeneous LTE radio access network, and comprises macro eNodeBs 104a, 104d, 104f and pico eNodeBs 104b, 104c, 104e, 104g. The serving areas 108a, 108d, 108f of the macro eNodeBs 104a, 104d, 104f are larger compared to the serving area 108b, 108c, 108e, 108g of the pico eNodeBs 104b, 104c, 104e, 104g. Further, the serving areas 108b, 108c of the pico eNodeBs 104b, 104c are locally embedded within the serving area of the 108a of the marco eNodeB 104a, and the serving areas 108e and 108g are locally embedded within the serving areas 108d and 108f of the marco eNodeB 104d and 108f, respectively.

A signal strength of a signal emitted by an access node 104a-104g serving a terminal 106a-106g decreases with a distance of the terminal 106a-106g receiving the signal from the serving access node 104a-104g. Correspondingly, the terminal 106a-106g experiences an increasing interference generated by another access node 104a-104g not serving the terminal 106a-106g with an increasing distance from the serving access node 104a-104g. For example, the terminal 106d is served by the pico eNodeB 104b and potentially receives interference from the access nodes 104a, 104d, 104f. In order to reduce interference from the non-serving access nodes 104a-104g, a resource pattern 110a-110c applied by each access node 104-104g comprises time-frequency resource units of a first type and a second type. A time and frequency based definition of the first and second resource units is identical, however, an allocation thereof to terminals 106a-106g and respective access nodes 104a-104g is different. The resource units of a first type are first resources 112a-112n and are reserved for and therefore usable by particular terminals 106a-106g to be served or currently be served by the particular access node 104a-104g and the resource units of a second type are second resources 114a-114g are reserved for and therefore usable by other terminals 106a-106g to be served or currently be served by other access nodes 104a-104g. Further, the resource pattern 110-110c applied by different access nodes 104a-104g are synchronized in time between each other in that a time repetition period of the resource pattern 110a-110c is fixed to an identical value and a start time of each resource pattern 110a-110c is identical to one another. For example, in the above described embodiment of the LTE radio access network 102, the resource pattern 110a determined by the macro eNodeB 104a and applied by the macro eNodeB 104a and the pico eNodeBs 104a, 104c is based on resource units in the form of sub-frames and is embodied as Protected Subframe (PSF) pattern. The resource units 112a, 112b, 112c-112e represent first resource units which are usable by the terminals 106a, 106b, and the resource units 114a-114c represent second resource units which are usable by the terminals 106c-106e. The first resource units 112a-112e are typically referred to as non-protected sub-frames and the second resource units 114a-114c are typically referred to as protected sub-frames. A time period of the resource pattern 110a is defined by a time length of 40 sub-frames, each of which corresponding to one Millisecond (ms). The resource pattern 110a-110c of the access nodes 104a-104g may also employ different frequency sub-bands of a defined frequency range, wherein each two sub-bands may be adjacent to one another or may be separated by a further frequency sub-band from one another.

In order to balance an amount of the first resources 112a-112n and the second resources 114a-114g in a resource pattern 110a-110c while coordinating a resource unit distribution in the respective resource pattern 110a-110c among each another, the access nodes 104a, 104d, 104f are adapted to determine an adapted resource pattern in regular time intervals, for example every 40 ms. The adapted resource pattern are applied by the involved access nodes 104a-104g subsequent to the determination thereof.

Figure 2:
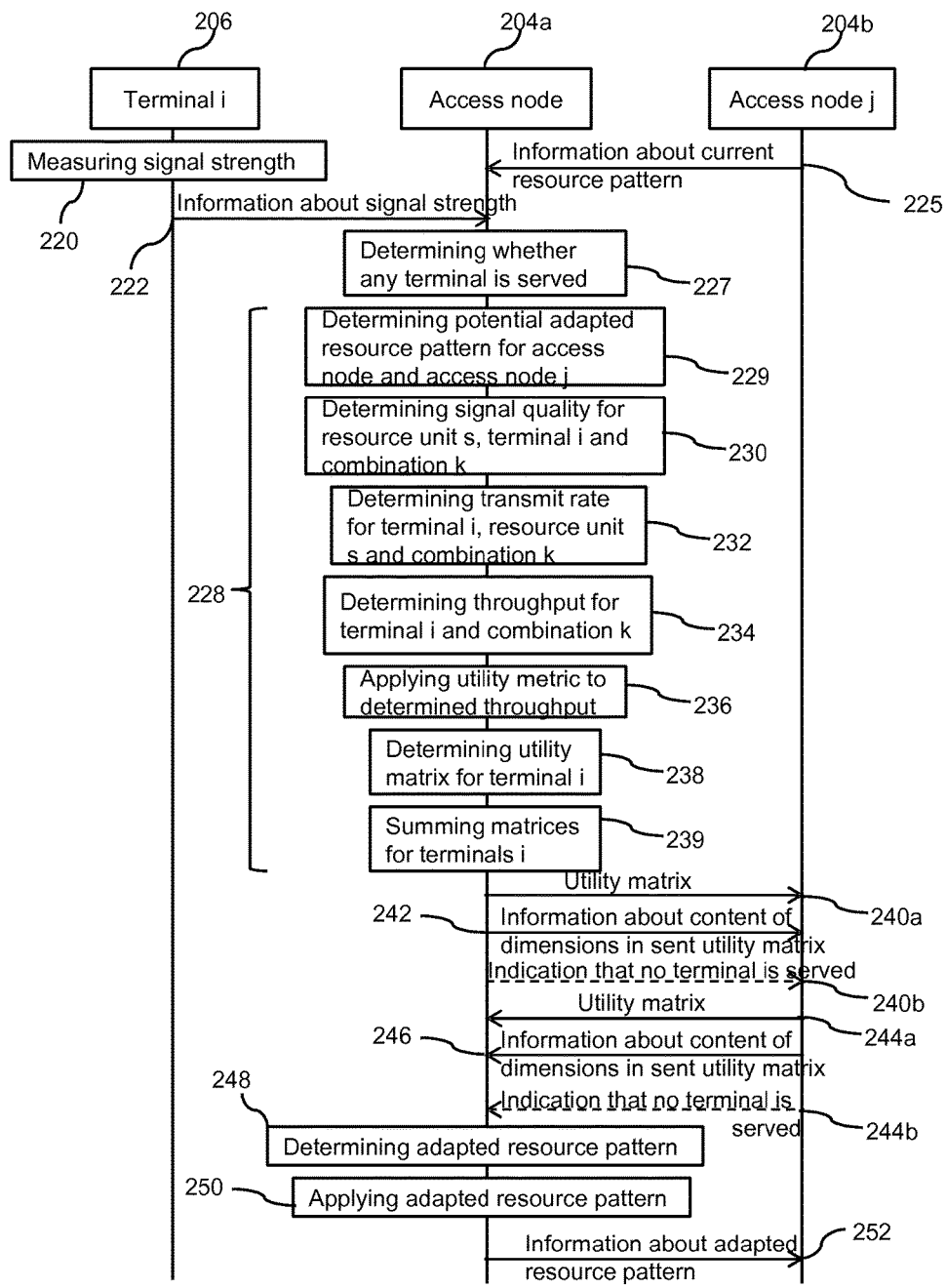
FIG. 2 is a signaling diagram illustrating a method for determining an adapted resource pattern to be applied by an access node according to an embodiment of the invention.

Referring to FIG. 2, a method for determining such an adapted resource pattern according to an embodiment of the invention will be explained in more detail. The method is performed by an access node 204a which serves one or more terminal 206 indexed by i. At least one further access node 204b indexed by j is adapted to provide input for the determination of the adapted resource pattern. The at least one further access node 204b may serve one or more further terminals. The access node 204a may potentially interfere the one or more further terminals. Alternatively or additionally, the further access node 204b may potentially interfere the one or more terminals 206. For example, the access node 204a may correspond to the access node 104a, hence is embodied as a macro eNodeB, but may also correspond to the access node 104b, hence is embodied as a pico eNodeB. The further access node 204b may correspond to the access node 104d, hence is embodied as a pico eNodeB, or to the access node 104d, hence is embodied as a macro eNodeB.

In a step 220, the terminal 206 measures a signal strength of those signals of access nodes 204a, 204b which are receivable by the terminal 206. The signal strength may correspond to a $RSRP_i$ representing a Cell-specific Reference Signal (CRS) power per Resource Element (RE). In the described embodiment, the terminal 206 is adapted to receive a RSRPi of its serving access node 204a and a $RSRP_{i,c}$ of the access node 204b with the index c identifying the potentially interfering access node 204b. It is noted that a number of access nodes 204b reporting a resource pattern 110b and a number $C_i$ of access nodes 204b potentially interfering the particular terminal 206 may be identical or different from one another. The terminal 206 thereupon sends information about the measured signal strength in a step 222 to its serving access node 204a, for example in a handover report. In a step 226, the access node 204b sends information about a currently applied resource pattern to the access node 204a, for example via the X2 interface defined in LTE. The access node 204a then determines in a step 227 whether the access node 204a serves any terminal. A sequence of the steps 220, 222 the step 226 and the step 227 may be reverse compared to the aforementioned described embodiment.

In the step 228, the access node 204a determines information indicative of a resource usage of the resources of its resource pattern reserved for the at least one terminal 206. Since the determination in the step 227 has been in the affirmative, the access node 204a determines in a step 229 its own potential adapted resource patterns using knowledge of its currently applied resource pattern and potential adapted resource patterns for the potentially interfering access nodes 204b whose signal strength has been reported by the terminal 206 in the step 222 using the information received in the step 226. This determination will be explained with reference to FIGS. 6a, 6b.

The access node 204a determines in a step 230 a potential signal quality perceived by the terminal 206 for a particular resource unit of its own potential adapted resource pattern and for a particular combination of its own potential adapted resource pattern and a potential adapted resource pattern of the potentially interfering access node 204b. For example, the access node 204a determines a potential $SINR_{i,s,k}$ in a linear domain according to $$SINR_{i,s,k} = \frac{RSRP_i}{\sum_{c=1}^{C_i} RSRP_{i,c} \cdot f_1(c,s) + \text{NOISE}}$$

The particular resource unit of the resource pattern of the access nodes 204a, 204b is indexed by s and the particular combination is indexed by k. A step-wise defined function $f_1(c,s)$ simulates a potential adapted resource pattern applied by each potential interfering access node 204b. A sum in the above formula is evaluated over all potentially interfering access nodes 204b indexed by c for which the terminal 206 has reported a $RSRP_{i,c}$ value. The term NOISE may represent noise experienced by the terminal 206 in the particular resource unit s for the combination k and the particular resource unit t.

A first value of $f_1(c,s)$ can be selected to be equal to 1, if the particular resource unit s in the resource pattern of the another access node indexed by c, particularly the access node 204b, corresponds to a first resource unit. A second value of $f_1(c,t)$ can be selected to be equal to particular predetermined value M, if the particular resource unit s corresponds to a second resource unit in the resource pattern of the access node c. The value M can be defined as a fraction of a total amount of REs, for example 10% of the number of REs, in order to account for CRS being transmitted or contained in the resource pattern of the access node c. In this respect, it is assumed that the access nodes 204a uses a RE for data transmission such that the interference perceived by the terminal 206 is equal to a $RSRP_{i,c}$ of this access node 204b. An interference contribution of one access node 204b increases with a measured $RSRP_{i,c}$ and the RE utilization of the potentially interfering access node 204b. The access node 204b uses only CRE-RE in a protected subframe and the interference level per RE is therefore by a particular MORS lower compared to the measured $RSRP_{i,c}$. The first value of $f_1(c,s)$ for s being a first resource unit can be also selected to correspond to a value between M and 1, which value may represent an RE utilization of the access node 204b. In such a case, the access node 204a may comprise information about an average RE utilization in a first resource unit by a potentially interfering access node 204b over the next resource pattern period.

In a next step 232, the access node 204a determines a transmit rate $R_{i,s,k}$ for the terminal 206, the particular resource unit s and the combination k. For example, the transmit rate $R_{i,s,k}$ can be determined using a mapping function $f_2$ applied to the $SINR_{i,s,k}$, hence $R_{i,s,k}=f_2(SINR_{i,s,k})$, or using a look-up table. Here, it is assumed that a given transport block error probability BLEP is present.

Next, in a step 234, the access node 204a determines a potential throughput $T_{i,k}$ perceived by the terminal 206 for the combination k in all resource units usable by the terminal 206 under the constraint that the potential throughput $T_{i,k}$ may be indicative of at least a next resource pattern period of the potential adapted resource pattern of the access nodes 204a, 204b. Further, short term effects resulting from fast fading might not be considered in the determination of $T_{i,k}$. A variation of the signal quality $SINR_{i,s,k}$ between different resource units s is considered to result from the potential adapted resource pattern of the potentially interfering access nodes 204b. In a first approach it is assumed that the access node 204a serves only the terminal 206. Accordingly scheduling constraints of multiple terminals 206 applied by the access node 204a can be omitted. Hence, the potential throughput $T_{i,k}$ can be derived according to $$T_{i,k} = \sum_{s=1|s\notin PSF}^{S} f_2(SINR_{i,s,k})/S,$$

wherein S represents a total number of resource units s measured along the time period of the potential adapted resource pattern of the access node 204a. A condition $s\notin PSF$ for the summation may reflect that in a resource unit s embodied as a second resource unit no terminal 206 is scheduled by the access node 204a.

Optionally, the summation can be evaluated only for those signal quality values, for example the $SINR_{i,s,k}$ values explained above, which are larger than a predetermined threshold value, for example a $SINR_{th}$ value, in order to avoid scheduling the terminal 206 in a resource unit s, in which the signal quality is too low such that a signal from the access node 204a, for example a scheduling grant from the access node 204a on the Control Channel (CCH) in LTE, is not detectable by the terminal 206. To this end, the access node 204a may compare the determined signal quality with the predetermined threshold value, and may consider only those signal quality values fulfilling the aforementioned condition. This case can be accordingly reflected in the described embodiment by a condition $SINR_{i,s,k}>SINR_{th}$ in the evaluation of the summation, and the potential throughput $T_{i,k}$ can be determined according to $$T_{i,k}=\Sigma_{s=1|SINR_{i,s,k}>SINR_{th}|s\notin PSF}f_2(SINR_{i,s,k})/S.$$

In a second approach the scheduling constraints are considered. Accordingly, the potential throughput $T_{i,k}$ can be determined depending on a scheduling scheme g applied by the access node 204 for the terminal 206 using the general assumption $T_{i,k}=R_{i,k}*g$. Assuming a round robin scheduling scheme reflected by the factor g in which all terminals 206 served by an access node 204a may obtain an equal amount of resource units s on average, hence an equal fraction of the sub-frames s, the potential throughput $T_{i,k}$ of the terminal 206 may be estimated according to $T_{i,k}=R_{i,k}/M$ with M representing a number of terminals 206 served by the access node 204a. The aforementioned equal resource sharing may also result from a frequently assumed proportional-fair scheduling scheme g, if one assumes that only short-term constant rate information $R_{i,k}$ may be available. Since the scheduling function equals to a constant factor $1/M_b$, the potential throughput $T_{i,k}$ equals to $$T_{i,k} = \sum_{s=1|SINR_{i,s,k}>SINR_{th}|s\notin PSF}^{S} f_2(SINR_{i,s,k})/S/M.$$

In a next step 236, a utility metric is applied to the determined potential throughput $T_{i,k}$. For example, the utility metric may reflect that an increasing throughput $T_{i,k}$ allowed for a terminal 206 may have a diminishing total return in terms of utility for a resource utilization of the access node 204a for the communication system 100. A corresponding utility metric may correspond to a logarithmic function $U_{i,k}=\log(T_{i,k})$ for the determination of a potential utility $U_{i,k}$. Alternatively, a square root like function can be used to map the potential throughput to the potential utility.

In a next step 238, the access node 204a determines for the terminal 206 a utility matrix $U_{i,p0,p1,\ldots,pcb}$ in which the potential utility values for each combination k are combined.

The step 220 is performed by each terminal 206 served by the access node 204a, and the steps 222 to 238 are performed by the access node 204a for each terminal 206, respectively, and are omitted in FIG. 2 for ease of illustration.

In each matrix, a dimension index $p_0$ corresponds to the access node 204a and the dimension indices $p1,\ldots,pcb$ correspond to a different one particular potentially interfering access nodes 204b. A total number of the potentially interfering access nodes 204b reported by all terminals 206 corresponds to $C_b$, i.e. the set of indices $p1,\ldots,pcb$ has $C_b$ elements. The number of dimensions of the utility matrix $U_{i, p0, p1, \ldots, pcb}$ corresponds to 1+Cb. Hence, a first dimension of the utility matrix corresponds to the access node 204a and each of the further dimensions p1, ..., pcb of the utility matrix correspond to one of the potentially interfering access nodes 204b for all terminals 206. Matrix elements along each dimension represent different potential adapted resource pattern for the access node 204a, 204b represented by the dimension. In order to account for different terminals 206, experiencing a different number of potentially interfering access nodes 204b, each matrix element along a dimension which represents a potential interfering access node indexed by c, for example the access node 204b, for which the terminal 206 has not sent information about a signal strength in the step 222, for example the dimension p2, is set to a value as calculated in the step 234 according to $U_{ip0, p1, \ldots, pcb} = U_{i,k}$, in which RSRPi,c is zero.

In a next step 239, the access node 204a sums the utility matrices $U_{i, p0, p1, \ldots, pcb}$ evaluated for all terminals 206 served by the access node 204a, hence performs a summation over i according to $U_{p0, p1, \ldots, pcb} = \Sigma_i U_{i, p0, p1, \ldots, pcb}$. A respective index b can be added to $U_{p0, p1, \ldots, pcb}$ in order to identify the access node 204a determining the utility matrix.

In a next step 240a, the access node 204a sends the information determined in the step 228 to the access node 204b. In the described embodiment, the access node 204a may send the determined utility matrix to the access node 204b. In a further step 242, the access node 204a may also send information about a content of the dimensions in the sent utility matrix. The latter information may be sent together with the matrix in one message. Since each access node 204a, 204b has an identical pre-configuration respecting a number of potential adapted resource pattern and an order thereof along a matrix dimension, the content relates to which dimension p0, p1, ..., pcb is associated with which access node 204a, 204b.

In a case in which the determination in the step 227 is not in the affirmative, the method may stop. Alternatively, the method may proceed and the access node 204a determines in the step 228 the information that the access node 204a does not serve a terminal. The access node 204a sends in a step 240b the determined information. The step 242 will be omitted. The step 229 can be performed. The step 240b can be also performed after the step 227.

In the following it is assumed that the steps 240a, 242 are performed. In a next step 244a, the access node 204a receives information indicative of a resource usage of resources reserved for terminals servable by the access node 204b. This information is comprised in a utility matrix which may be determined by the access node 204b in a similar way as described above. In a step 246, the access node 204a further receives information about the content of the dimensions of the received utility matrix from the access node 204b. Here, the content is similarly defined as explained with reference to the step 239. The matrix and the information may be also sent in one message. Alternatively, the information may indicate that the access node 204b does not serve a terminal. The associated step is labeled by 244b. The steps 244a, 224b, 246 can be performed at any arbitrary time with respect to the steps 222 to 239.

In a next step 248, the access node 204a determines the adapted resource pattern to be applied by the access node 204a by relating the received and determined information to one another. Exemplary embodiments of this step 248 for the case that the steps 240a, 242, 244a, 246 have been performed are explained with reference to FIGS. 3 and 4. In this determination, the determined utility matrix and the received utility matrix are used together with the information about the content of the dimensions of the received utility matrix.

In a case in which the determination in the step 227 is not in the affirmative and the steps 240a, 242 are performed or the step 240b is performed, the access node 204a may determine that its currently used resource pattern is the adapted resource pattern. As discussed above, the step 229 can be omitted. Alternatively, the step 229 is performed, and the access node 204a selects a potential adapted resource pattern which is identical to the currently applied resource pattern. Alternatively, the access node 204a may construct a zero matrix for its own resource usage which is used in the exemplary embodiments of FIGS. 3, 4.

Figure 3:
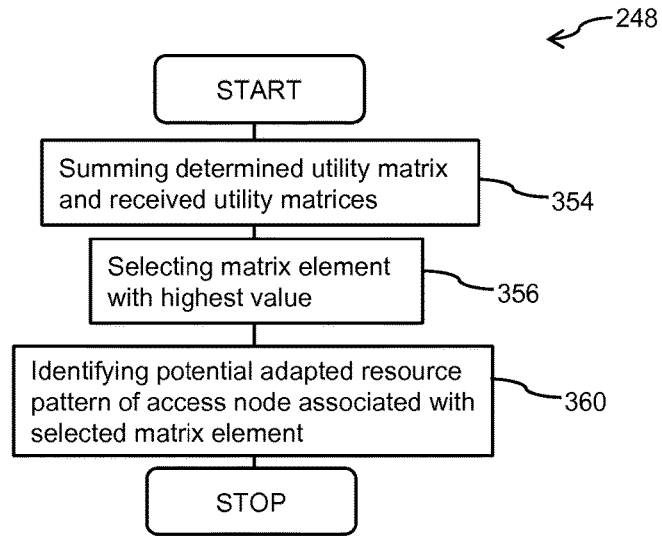
FIG. 3 is a flow chart illustrating an exemplary embodiment of a step of determining the adapted resource pattern in FIG. 2.
Figure 4:
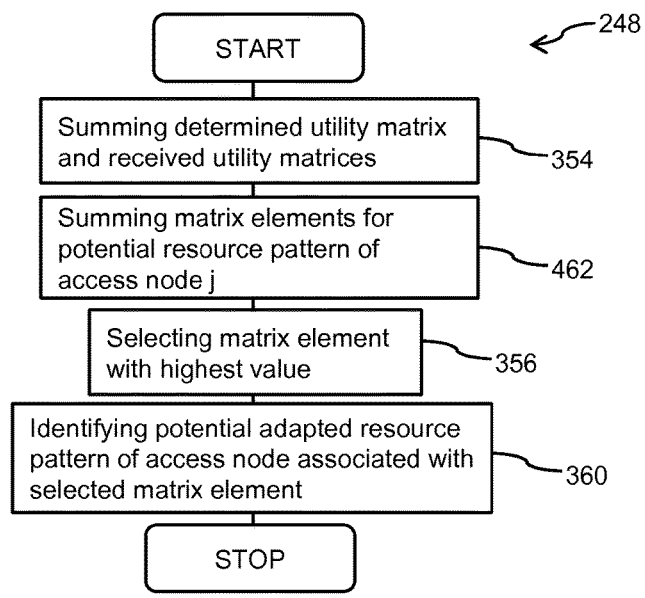
FIG. 4 is a flow chart illustrating another exemplary embodiment of the step of determining the adapted resource pattern in FIG. 2.

In a case in which the determination in the step 227 is in the affirmative and the access node 204a receives in the step 244b the information that the access node 204b does not serve a terminal, the access node 204a may construct a zero matrix for the access node 204b which is used in the exemplary embodiments of FIGS. 3, 4.

In a next step 250, the access node 204a may apply the adapted resource pattern in response to the step 248, and informs in a step 252 the access node 204b about the adapted resource pattern by sending respective information.

As illustrated in FIG. 3, the access node 204a performs the step 248 by summing the determined utility matrix and the received utility matrix element-wise and for each dimension p0, p1, ..., pcb in a step 354. To this end, the information received in the step 246 is used in combination with the internal pre-configuration relating to the content of the dimensions of the determined utility matrix such that matrix elements associated with corresponding access nodes 204ab, 204b and corresponding potential adapted resource pattern are correctly summed. In a next step 356, the access node 204a selects a matrix element of the summed utility matrix having a highest value. In a further step 360, the access node 204a identifies the potential adapted resource pattern of the access node 204a corresponding to the selected matrix element in the step 356. This potential adapted resource pattern is the determined adapted resource pattern.

In one simplified exemplary embodiment, the access nodes 204a and 204b interfere one or more terminals served by the respective other access node 204a, 204b. The access node 204a determines in the step 228 three potential adapted resource pattern for each access node 204a, 204b using an own pre-configuration. The potential adapted resource pattern are identified by identifiers A, B, C which indicate a change in a number of second resource units. For example, A is equal to zero, hence the number of second resource units remain unchanged, B is equal to −1, hence the number of second resource units is reduced by one second resource unit, and C equals to 1, hence the number of second resource units is increased by one second resource unit. The utility matrix $U_{p0,p1}$ of the access node 204a determined in the step 238 corresponds to $$\begin{pmatrix} u1 & u2 & u3 \\ u4 & u5 & u6 \\ u7 & u8 & u9 \end{pmatrix}$$

wherein the first dimension p0 (vertical) corresponds to the access node 204a and the second dimension p1 (horizontal) corresponds to the access node 204b. Along each dimension starting from a matrix element (1|1) corresponding to the matrix element in the upper left corner of the above matrix, the potential adapted resource pattern are arranged in the order of A, B, C. The received matrix $U'_{p0,p1}$ corresponds to $$\begin{pmatrix} u'1 & u'2 & u'3 \\ u'4 & u'5 & u'6 \\ u'7 & u'8 & u'9 \end{pmatrix}$$

A first dimension p0 (vertical) corresponds to the access node 204a and the second dimension p1 (horizontal) corresponds to the access node 204b. Along each dimension starting from a matrix element (1|1) corresponding to the matrix element in the upper left corner of the above matrix, the potential adapted resource pattern are also arranged in the order of A, B, C. The summed matrix obtained in the step 354 corresponds to $$\begin{pmatrix} u1+u'1 & u2+u'2 & u3+u'3 \\ u4+u'4 & u5+u'5 & u6+u'6 \\ u7+u'7 & u8+u'8 & u9+u'9 \end{pmatrix}$$

Assuming the matrix element u6+u'6 to have the highest value, the potential adapted resource pattern identified in the step 360 of the access node 204a corresponds to the resource pattern B of the access node 204a. Assuming the access node 204b receiving the matrix determined in the step 228 by the access node 204a and the access node 204b determining its adapted resource pattern in the step 248, the access node 204b may identify the resource pattern C. Hence, a coordination of the resource unit distribution in the adapted resource pattern of the access nodes 204a, 204b may be enabled while each access node 204a, 204c determines its own adapted resource pattern.

As illustrated in FIG. 4, a further exemplary embodiment of the step 248 in FIG. 2 is performed similarly to the exemplary embodiment of the step 248 explained with reference to FIG. 3, and comprises an additional step 462 to be performed by the access node 204a between the steps 354 and 356. In this step 462, the access node 204a sums those matrix elements of the summed utility matrix obtained in the step 354 which are arranged in one dimension and correspond to potential adapted resource patterns A, B, C of one potentially interfering access node c, particularly the access node 204b. This summing is performed for each dimension associated with a potentially interfering access node 204b. Therefore a reduction of the dimension of the summed utility matrix obtained in the step 354 may be accomplished. The matrix element selected in the step 360 corresponds to the matrix element having the highest value.

With respect to the above embodiment, the matrix obtained by the access node 204a in the step 462 corresponds to $$\begin{pmatrix} u1+u'1+u2+u'2+u3+u'3 \\ u4+u'4+u5+u'5+u6+u'6 \\ u7+u'7+u8+u'8+u9+u'9 \end{pmatrix}.$$

In the step 356, the matrix element having the highest value is selected. The selected matrix element may correspondsponds to the matrix element selected in the embodiment of FIG. 3, but may be also different depending on the particular matrix element values of the received and determined utility matrices. A corresponding matrix obtained by the access node 204b corresponds to (u1+u'1+u4+u'4+u7+u'7 u2+u'2+u5+u'5+u8+u'8 u3+u'3+u6+u'6+u9+u'9).

Figure 5:
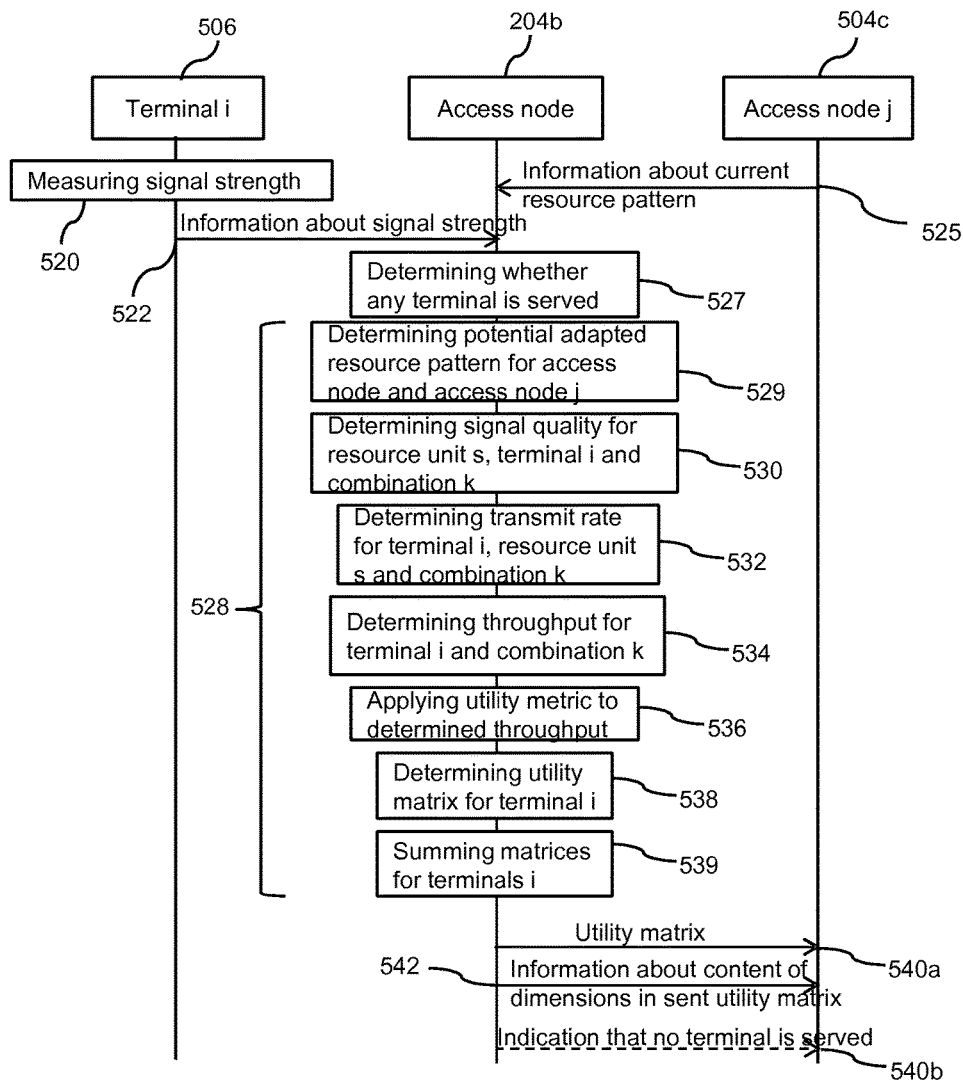
FIG. 5 is a signaling diagram illustrating a method for an access node to be used in association with determining an adapted resource pattern to be applied by a further access node according to an embodiment of the invention.

Referring to FIG. 5, a corresponding method to be used in association with determining an adapted resource pattern to be applied by the access node 204a will be explained. The method is performed by the access node 204b. A potential interfering access node involved in the method is denoted by a reference numeral 504c and index j, and may correspond to the access node 204a in FIG. 2 or to a different access node of FIG. 1. The access node 204b serves one or more terminals 506 denoted by an index i. Method steps 520-542 explained in FIG. 2 for the access node 204a are similarly performed by the access node 204b.

Figure 6A:
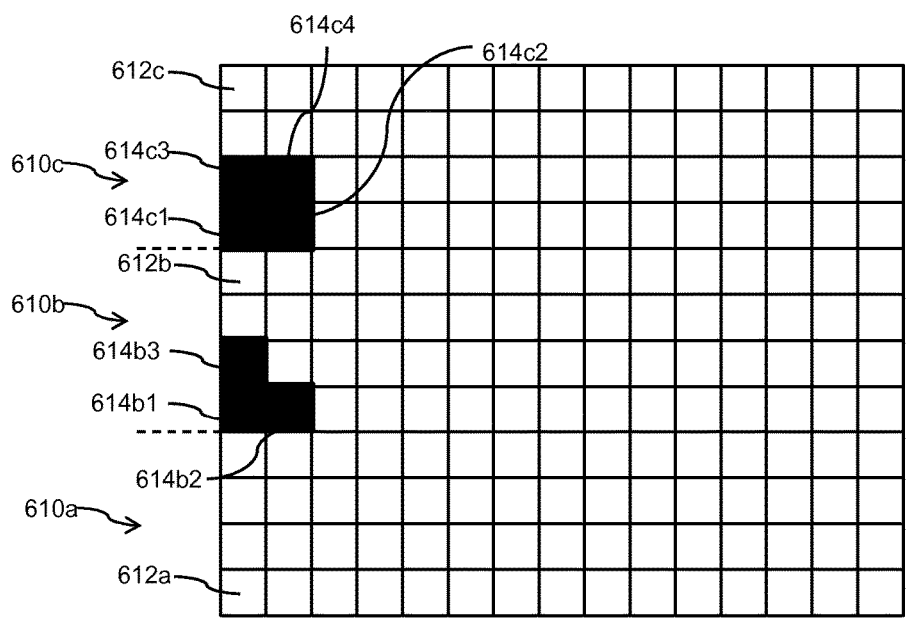
FIG. 6a illustrate current resource pattern of access nodes usable in the method of FIGS. 2 and 5.
Figure 6B:
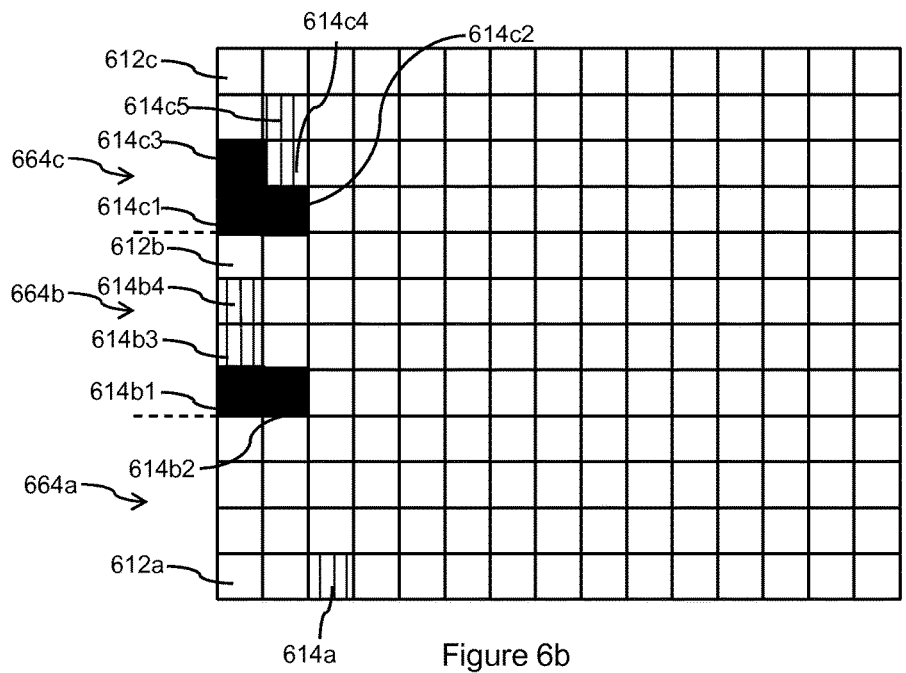
FIG. 6b illustrate potential adapted resource pattern of access nodes usable in the method of FIGS. 2 and 5.

Referring to FIGS. 6a, 6b, exemplary embodiments of the steps 229, 529 of determining the potential adapted resource pattern of the respective access node 204a, 204b will be explained in more detail. For example, it is assumed that a first access node, for example the access node 204a, may determine the adapted resource pattern and a second access node and a third access node, each one being for example the access node 204b with indices j and j+1, may potentially interfere the terminals 206 served by the first access node. Current resource pattern of the first, second and third access nodes are denoted by reference numerals 610a, 610b, 610c, and potential adapted resource pattern of the first, second and third access nodes are denoted by reference numerals 664a-664c. A time increases from left to right and a frequency increases from bottom to top in a plane of drawing of FIGS. 6a, 6b.

Each of the resource pattern 610a-610c form adjacent sub-bands with respect to a usable frequency range, wherein the sub-band separation is indicated by dashed lines. The resource pattern 610a-610c are synchronized in time to one another. First resource units are illustrated by white blocks and a reference numeral 612 and second resource units are illustrated by black blocks and a reference numeral 614. In FIGS. 6a and 6b, only one first resource unit 612a-612c is labeled for illustration purposes in each resource pattern 610a-610c, 664a-664c. A total amount of resource units is fixed in each resource pattern 610a-610c, 664a-664c to the same value.

FIG. 6a illustrates the currently applied resource pattern 610a-610c. The current resource pattern 610a of the first access node is free of second resource units, hence only comprises first resource units. The current resource pattern 610b of the second access node comprises second resources 614b1-614b3 assigned to when seen in time and frequency firstly arranged resource units. These resource units 614b1-614b3 are the resource unit being first in time and frequency, being first in time and second in frequency, and being second in time and first in frequency. Thus the second resource units 614b are consecutive with respect to time and frequency to one another. First resource units 612b in the resource pattern 610b are assigned to remaining locations in the resource pattern 610b. The current resource pattern 610c of the third access node comprises four second resource units 614c1-614c4 which are arranged in time and frequency in a consecutive way to one another and at a beginning of the resource pattern 610c with respect to time and frequency. Hence, the second resource units 614c1-614c4 correspond to a resource unit 614c1-614c4 being first in time and frequency, being second in time and first in frequency, being first in time and second in frequency and being second in time and frequency.

FIG. 6b illustrates potential adapted resource pattern 664a, 664b, 664c as determined by the first access node. In general, the potential adapted resource pattern 610a-610c may comprise an identical amount of second resource units 614a-614c compared to, an increased amount of second resource units 614a-614c compared to or a decreased amount of second resource units 614a-614c compared to the currently applied resource pattern 610a-610c. To this end, the first access node comprises a pre-configuration about a predetermined number of second resource units 614a which can be at most added and/or removed from the current resource pattern 610a-610c of the first, second and third resource pattern 610a-610c in steps of one second resource unit 614a-614c and which resource units can be assigned or de-assigned as second resource unit 614c-614c in the resource pattern 664a-664c of one access node with respect to time and frequency and depending on the resource pattern 664a-664c of the respective other access nodes. Information about the current resource pattern 610b, 610c is sent from the second and third access nodes, respectively to the first access node. The number of combinations of the potential adapted resource pattern 664a-664c of the involved access nodes comprises at most $(1+N)^{(Ci+1)}$ elements, wherein N equals the number of possible resource units being changeable between first and second resource units in a potential adapted resource pattern and Ci equals the number of potentially interfering access nodes. In this respect, it is assumed that per adaption determination only one resource unit can be changed between a first resource unit and a second resource unit. It is also assumed that the number N is identical for each involved access node, i.e. in the described embodiment for the first, second and third access nodes.

Limiting the number of modifiable resource units N may reduce the number of potential adapted resource pattern and therefore the number of combinations k. Further, the number of potential adapted resource pattern may also be reduced by limiting Ci, for example by only using those RSRPi,c being above a threshold.

For example, in the simplified examples of FIGS. 3, 4, it is assumed that per adaption determination only one resource unit can be changed between a first resource unit and a second resource unit. The number of modifiable resource units per each resource pattern of each access node 204a, 204b is equal to two. Further, Ci equals to one, resulting in nine combinations k. The three potential adapted resource pattern have been indicated in the description of FIGS. 3, 4 as A, B, C, in which the change of the number of second resource units is equal to 0, −1 or 1.

In this described example of FIGS. 6a, 6b, the predetermined number may correspond to 1. A second resource unit can only be added at a location being minimum in time and frequency and usable with respect to the other resource pattern. In a case in which a tie between a location in time and frequency exits, the resource unit of only one of the locations can be added. For example, in the resource pattern 610c, the first resource unit being third in time and first in frequency and the first resource unit being first in time and third in frequency are equally addable. Therefore the addition of a second resource unit is limited to one of these first resource units. A second resource unit can also only be removed adjacent to another second resource unit, wherein the removed resource unit should be maximum in time and frequency. In a case in which a tie between a location in time and frequency exits, the resource unit of only one of the locations can be removed. As further constraints in accordance with the above constraints, in the potential adapted resource pattern 664a, a second resource unit 614a can only be added as a resource unit being third in time and first in frequency. In the potential adapted resource pattern 664b, a second resource unit 614b4 can be only added as a resource unit being first in time and third in frequency and only the second resource unit 614b3 can be removed. In the potential adapted resource pattern 664c, a second resource unit 614c5 can be only added as a resource unit being second in time and third in frequency and only the second resource unit 614c3 can be removed. Added and removed second resource units are indicated by dashed blocks.

Therefore a first potential adapted resource pattern 664a is identical to the currently applied resource pattern 610a, and a second potential adapted signal pattern 664a comprises the second resource unit 614a as described above. A first potential adapted resource pattern 664b is identical to the currently applied resource pattern 610b. A second potential adapted signal pattern 664b comprises the second resource unit 614b1-614b4 and a third potential adapted resource pattern only comprises the second resource units 614b1-614b2. A first potential adapted resource pattern 664c is identical to the currently applied resource pattern 610c. A second potential adapted signal pattern 664c comprises the second resource unit 614c1-614c4 and a third potential adapted resource pattern only comprises the second resource units 614c1-614c3.

The potential combinations k combine one resource pattern 664a-664c for each of the first, second and third access nodes.

Figure 7:
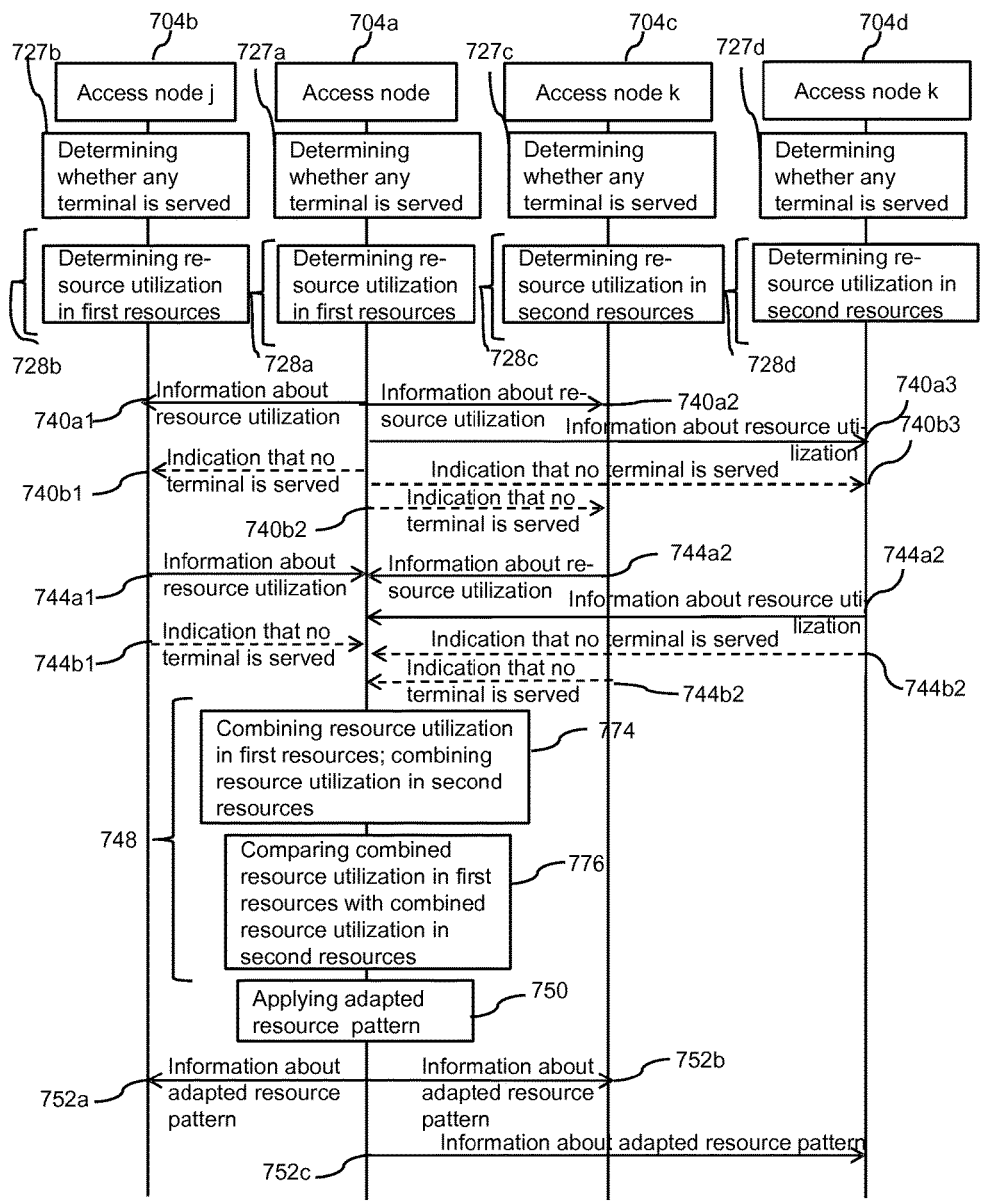
FIG. 7 is a signaling diagram illustrating a method for adapting a resource pattern to be applied by an access node according to another embodiment of the invention.

Referring to FIG. 7, a method for determining an adapted signal resource pattern according to another embodiment of the invention will be explained. An underlying communication scenario corresponds to the communication system illustrated in FIG. 1. The method is performed by the access node 704a which defines and applies a particular resource pattern. Another access node 704b indexed by j is embodied as a neighboring access node of an equivalent type which defined and applies a different resource pattern. Further access nodes 704c, 704d indexed by k utilize resource units of the resource pattern of the access node 704a. Each access node 704a-704d may serve one or more terminals which accordingly may utilize resource units of the respective applicable resource pattern. For example, the access node 704a corresponds to the access node 104a. The access node 704b may correspond, for example, to the access nodes 104d, 104f. Each of the access nodes 704c, 704d may correspond, for example, to one of the access nodes 104b, 104c.

In a first step 727a of the method, the access node 704a determines whether the access node 704a serves any terminal. Similar steps 727b-727d are performed by each of the other access nodes 727a-727d. If the determination is in the affirmative, the method proceeds to the step 728a. If the determination is not in the affirmative, the method may stop or may proceed to the step 728a.

In the step 728a, the access node 704a determines information indicative of a resource usage of resources reserved for terminals servable by the access node 704a. It is assumed in the following that each of the access nodes 704a-704d serves at least one terminal. To this end, the access node determines a resource utilization of those resource units of its resource pattern which are reserved for and therefore are usable by the one or more terminals served by the access node 704. Similar steps 728b-728d are performed by the access nodes 704*b*-704*d*. Hence, the access nodes 704*a*, 704*b* determine a resource utilization in the first resource units, whereas the access nodes 704*c*, 704*d* determine a resource utilization in the second resource units of the applicable resource pattern. Alternatively, if the determination in the step 727*a*-727*d* is not in the affirmative, the information determined by the access node 704*a*-704*d* in the step 728*a*-728*d* indicates that the access node 704*a*-704*d* does not serve any terminal. In a next optional step 740*a*1-740*a*3, 740*b*1-740*b*3, the access node 704*a* sends the respective determined information to the other access nodes 704*b*-704*d*.

In a next step 744*a*1-744*a*3, 744*b*1-744*b*3, the access node 704*a* receives the information determined by the access nodes 704*b*-704*d* in the steps 728*b*-728*d*. In a next step 748, the access node 704*a* determines the adapted resource pattern to be applied. Similar steps may be performed by the access nodes 704*b*-704*d* and are omitted in FIG. 7 for illustration purposes. If the access node 704*a* receives the information about the resource utilization, the access node 704*a* combines in a step 774 the information received in the steps 744*a*1-744*a*3 with the information determined in the step 728*a* in response to a receipt of the information in the steps 744*a*1-744*a*3. To this end, the access node 704*a* averages the resource utilization in the first resource units of the access nodes 704*a*, 704*b* and averages the resource utilization in the second resource units of the access nodes 704*c*, 704*d* by using a suitable averaging function $f1(RU_a, RUb)$ and $f2(RU_c, RU_d)$, respectively. Indices a to d denote the access nodes 704*a*-704*d* with which the resource utilization RU is associated. In a further step 776, the access node 704*a* compares the averaged resource utilization $RU_1$ in the first resource units with the averaged resource utilization $RU_2$ in the second resource units using a predetermined threshold T, for example using the algorithm If $abs(RU_1-RU_2)<T$ Then change in number of second resource units of adapted resource pattern is zero If $RU_1-RU_2>T$ Then change in number of second resource units of adapted resource pattern is minus one If $RU_2-RU_1>T$ Then change in number of second resource units of adapted resource pattern is one. The determination of the adapted resource patterns of the access node 704*a* used in the above algorithm correspond to the resource patterns described with reference to FIGS. 1 to 6 with the exception that no knowledge about a current resource pattern of the access nodes 704*b*-704*d* is used in the determination. Hence, a second resource unit addition to or removal from the current resource pattern results in a resource pattern similar described with respect to FIG. 6*b*. It is noted that the above algorithm equally applies for an access node embodied as a macro eNodeB and at least one further access node embodied as a pico eNodeB with $RU_1$ and $RU_2$ being respective resource utilization of these access nodes. The adapted resource pattern is the resource pattern identified in the above algorithm.

If the access node 704*a* receives the information that the access node 704*b*-704*d* does not serve a terminal, the access node 704*a* determines that the resource utilization of this access node 704*b*-704*d* in the respective first or second resources is zero and accordingly performs the steps 774, 776 using this information. Similarly, if the access node 704*a* has determined in the step 727*a* that the access node 704*a* does not serve any terminal, the access node 704*a* sets its own resource utilization in the first resources to zero and performs the steps 774, 776. Alternatively, the access node 704*a* determines that the currently applied resource pattern of the access node 704*a* is the adapted resource pattern without performing the steps 774, 776. It is noted that the access node 704*a* performs the step 748 in accordance with the above description for various combinations of the kind of the received and determined information.

In a further step 750, the access node 704*a* applies the determined adapted resource pattern. In subsequent steps 752*a*-752*c*, the access node 704*a* informs the access nodes 704*a*-704*e* about the determined adapted resource pattern. Similar steps may be performed by the access nodes 704*b*-704*d*.

Figure 8:
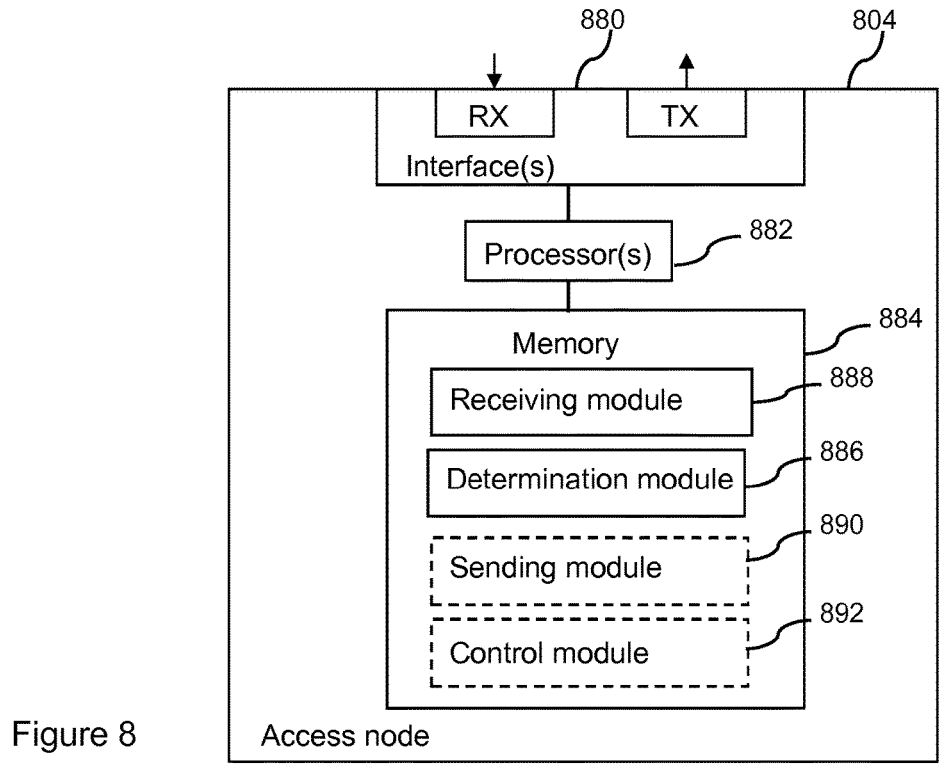
FIG. 8 is a block diagram illustrating an access node for determining an adapted resource pattern to be applied by the access node according to an embodiment of the invention.

Referring to FIG. 8, an exemplary structure which may be used for implementing the concepts according to the invention in an access node 804 for determining an adapted resource pattern to be applied by the access node 804 will be described. The resource pattern comprises time-frequency resource units. The access node 804 comprises at least one interface 880, for example for wireless or wiredly communicating with a further access node. RX denotes a receiving capability of the interface 880 and TX denotes a sending capability of the interface 880. The interface 880 may be also adapted for wirelessly communicating with a terminal. Alternatively, the access node 804 may also comprise a further interface, for example a radio interface, for implementing the latter functionality. The access node 804 also comprises one or more processors 882 coupled to the one or more interfaces 880, and a memory 884 coupled to the one or more processors 882. The memory 884 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 884 stores instructions, for example suitably configured program code for example in the form of program modules, to be executed by the one or more processors 882, in order to implement functionalities of the access node 804 described above. To this end, the memory 884 comprises a determination module 886 for implementing functionalities related to determining information indicative of a resource usage of resources of the access node 804 reserved for at least one terminal servable by the access node 804. A reception module 888 stored in the memory 884 implements functionalities for receiving, via the interface 880 from at least one further access node, information indicative of a resource usage of resources of the at least one further access node reserved for at least one further terminal servable by the at least one further access node. The determination module 886 also implements functionalities related to determining an adapted resource pattern to be applied by the access node 804 based on the determined information in relation to the received information. Alternatively, the memory 884 may store a different determination module for implementing the latter functionality. The memory 884 may also comprise an optional sending module 890 for implementing functionalities related to sending data in association with the method. The memory 884 may also comprise an optional control module 892 for implementing known functionalities related to controlling the access node 804, for example with respect to sending and/or receiving data from a terminal, from further access nodes or core network nodes. The access node 804 may be adapted to perform a method described above, and may comprise suitable program modules in the memory 884 for implementing respective steps of the method. Alternatively, such functionalities may be implemented by one or more of the modules 886-892.

In one embodiment, the access node 804 may be embodied as the access node 204b. In another embodiment, the access node 804 may be embodied as the access node 704a.

Figure 9:
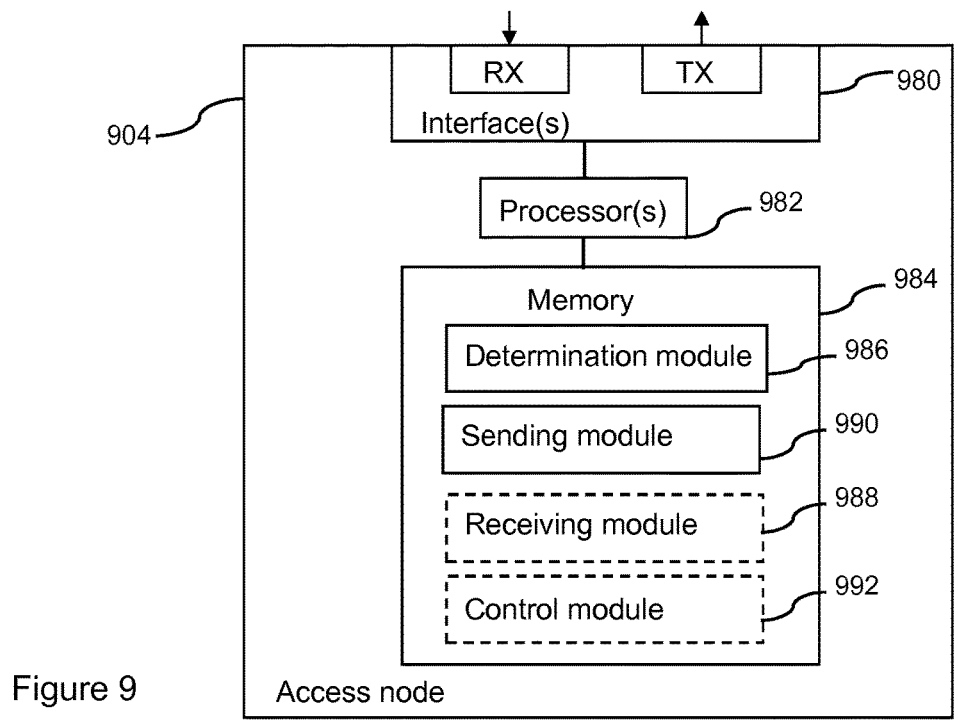
FIG. 9 is a block diagram illustrating an access node to be used in association with determining an adapted resource pattern to be applied by a further access node according to an embodiment of the invention.

FIG. 9 illustrates another exemplary structure which may be used for implementing the concepts according to the invention in an access node 904 to be used in association with determining an adapted resource pattern to be applied by a further access node. The resource pattern comprises time-frequency resource units. The access node 904 comprises at least one interface 980, for example for wireless or wiredly communicating with the further access node. RX denotes a receiving capability of the interface 980 and TX denotes a sending capability of the interface 980. The interface 980 may be also adapted for wirelessly communicating with a terminal. Alternatively, the access node 904 may also comprise a further interface, for example a radio interface, for implementing the latter functionality. The access node 904 also comprises one or more processors 982 coupled to the one or more interfaces 980, and a memory 984 coupled to the one or more processors 982. The memory 984 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 984 stores instructions, for example suitably configured program code for example in the form of program modules, to be executed by the one or more processors 982, in order to implement functionalities of the access node 904 described above. To this end, the memory 984 comprises a determination module 986 for implementing functionalities related to determining information indicative of a potential throughput perceived by at least one terminal served by the access node 904, and a sending module 990 for implementing functionalities for sending, via the interface 980 to the further access node, the determined information. An optional reception module 988 in the memory 984 may implement functionalities related to receiving data in association with the method. An optional control module 992 of the memory 984 may implement known functionalities related to controlling the access node 904, for example with respect to sending and/or receiving data from a terminal, from further access nodes or core network nodes. The access node 904 may be adapted to perform a method described above, and may comprise suitable program modules in the memory 984 for implementing respective steps of the method. Alternatively, such functionalities are implemented by one or more of the modules 986-992. The access node 904 may be embodied as the access node 204b.

Figure 10:
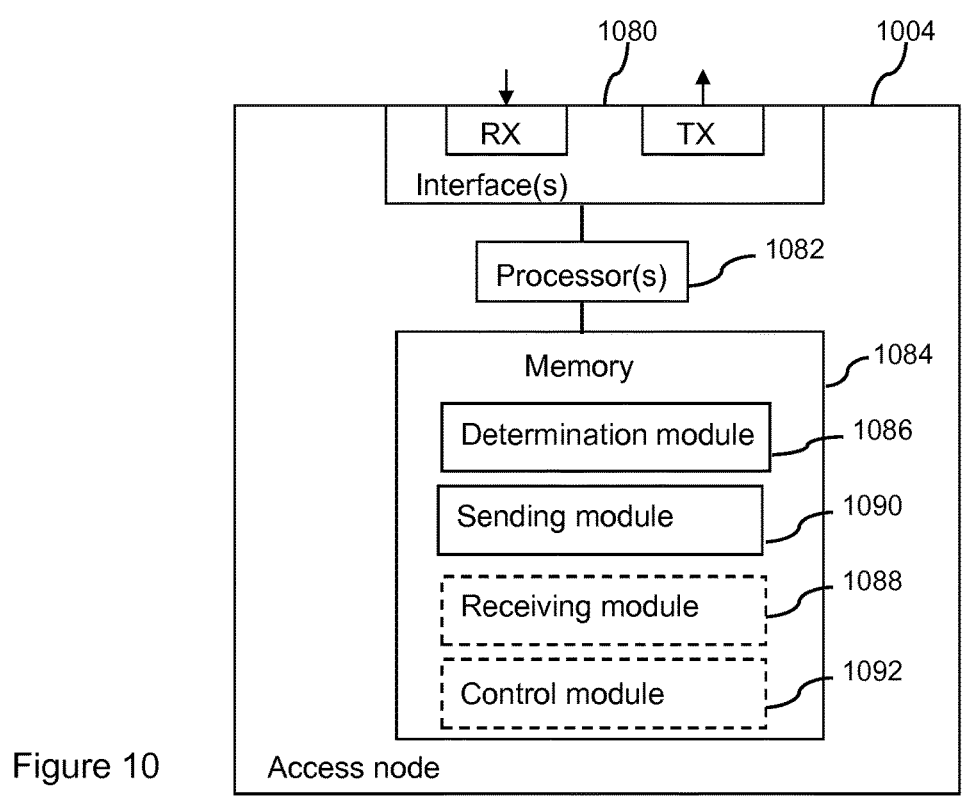
FIG. 10 is a block diagram illustrating an access node to be used in association with determining an adapted resource pattern to be applied by a further access node according to another embodiment of the invention.

FIG. 10 illustrates another exemplary structure which may be used for implementing the concepts according to the invention in an access node 1004 to be used in association with determining an adapted resource pattern to be applied by a further access node. The resource pattern comprises time-frequency resource units. The access node 1004 comprises at least one interface 1080, for example for wireless or wiredly communicating with the further access node. RX denotes a receiving capability of the interface 1080 and TX denotes a sending capability of the interface 1080. The interface 1080 may be also adapted for wirelessly communicating with a terminal. Alternatively, the access node 1004 may also comprise a further interface, for example a radio interface, for implementing the latter functionality. The access node 1004 also comprises one or more processors 1082 coupled to the one or more interfaces 1080, and a memory 1084 coupled to the one or more processors 1082. The memory 1084 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 1084 stores instructions, for example suitably configured program code for example in the form of program modules, to be executed by the one or more processors 1082, in order to implement functionalities of the access node 1004 described above. To this end, the memory 1084 comprises a determination module 1086 for implementing functionalities related to determining information indicative of a resource usage of resources of the access node 1004 reserved for at least one terminal servable by the access node 1004. The determined information indicates that the access node 1004 is not serving a terminal. The memory 1084 comprises a sending module 1090 for implementing functionalities for sending, via the interface 1080 to the further access node, the determined information. An optional reception module 1088 in the memory 1084 may implement functionalities related to receiving data in association with the method. An optional control module 1092 of the memory 1084 may implement known functionalities related to controlling the access node 1004, for example with respect to sending and/or receiving data from a terminal, from further access nodes or core network nodes. The access node 1004 may be adapted to perform a method described above, and may comprise suitable program modules in the memory 1084 for implementing respective steps of the method. Alternatively, such functionalities are implemented by one or more of the modules 1086-1092.

In one embodiment, the access node 1004 may be embodied as the access node 204a or 204b. In another embodiment, the access node 1004 may be embodied as one of the access nodes 704a-707d.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation. The description of the invention with reference to LTE may not exclude the described invention being applicable in other communication technologies being different from LTE. For example, the invention may be applicable in other 3GPP radio access networks such as Global System for Mobile Communications (GSM) Enhanced Data Rates for GSM Evolutio (EDGE) Radio Access Network (GERAN) or Universal Mobile Telecommunications System (UMTS) Terrestrial Radio Access Network (UTRAN) or in a communication technology different from 3GPP.

The invention claimed is:

1. A method for determining an adapted resource pattern to be applied by a macro access node in a heterogeneous radio network, the method being performed by the macro access node and comprising:

using a resource pattern to serve one or more terminals from the macro access node, the resource pattern being selected resources from among first resources allocated for usage by one or more macro access nodes, including the macro access node, and excluding second resources allocated for usage by one or more pico access nodes operating in one or more coverage areas associated with the one or more macro access nodes, and the first and second resources being respectively allocated from available time-frequency resources;

determining a utilization of the first resources, based at least on a current utilization of the first resources at the macro access node;

determining a utilization of the second resources, based on receiving utilization information from the one or more pico access nodes, indicating current utilization of the second resources;

comparing the utilization of the first resources with the utilization of the second resources, and updating the respective allocations of the first and second resources in dependence on the comparison, wherein updating the allocations of the first and second resources in dependence on the comparison comprises:

determining an average utilization of the first resources by the macro access node and one or more neighboring macro access nodes that are using selected resources from the first resources;

determining an average utilization of the second resources by the one or more pico nodes;

increasing the allocation for the second resources and correspondingly decreasing the allocation for the first resources, responsive to determining that the average utilization of the second resources exceeds the average utilization of the first resources by more than a threshold amount;

increasing the allocation for the first resources and correspondingly decreasing the allocation for the second resources, responsive to determining that the average utilization of the first resources exceeds the average utilization of the second resources by more than a threshold amount; and leaving the allocations for the first and second resources unchanged, responsive to determining that the average utilizations of the first and second resources differ by no more than a threshold amount; and determining the adapted resource pattern to be next applied by the macro access node by adapting the resource pattern based at least in part on the respective allocations.

2. The method according to claim 1, wherein determining the utilization of the first resources comprises determining a current utilization of the first resources at the macro access node, and receiving utilization information from one or more other macro access nodes neighboring the macro access node, indicating respective utilizations of the first resources at the one or more other macro access nodes, and wherein determining the adapted resource pattern includes updating the selected resources, as selected from the first resources for use by the macro access node, in dependence on resource selections from the first resources in use at the one or more other macro access nodes.

3. The method according to claim 1, wherein determining the adapted resource pattern comprises updating the selected resources, as selected by the macro access node from among the first resources, based on the respective allocations, and further based on respective resource selections made by one or more neighboring macro access nodes from among the first resources, for serving terminals from the one or more neighboring macro access nodes, and wherein the macro access node receives information from one or more neighboring macro access nodes indicating the respective resource selections, the method further comprising:

receiving, from at least one another access node, another information indicative of a resource usage of resources of the at least one another access node by at least one another terminal served by the at least one another access node, wherein the step of determining the adapted resource pattern comprises:

combining the another information with the determined information or with the received information, wherein the step of comparing is performed on the combined information and the received information or on the determined information and the combined information.

4. A macro access node for determining an adapted resource pattern to be applied by the macro access node, the macro access node comprising:

at least one processor; and a memory comprising instructions executable by the at least one processor, whereby the macro access node is configured to:

use a resource pattern to serve one or more terminals from the macro access node, the resource pattern being selected resources from among first resources allocated for usage by one or more macro access nodes, including the macro access node, and excluding second resources allocated for usage by one or more pico access nodes operating in one or more coverage areas associated with the one or more macro access nodes, and the first and second resources being respectively allocated from available time-frequency resources;

determine a utilization of the first resources, based at least on a current utilization of the first resources at the macro access node;

determine a utilization of the second resources, based on receiving utilization information from the one or more pico access nodes, indicating current utilization of the second resources;

compare the utilization of the first resources with the utilization of the second resources, and update the respective allocations of the first and second resources in dependence on the comparison, wherein the update of the respective allocations of the first and second resources in dependence on the comparison comprises:

determining an average utilization of the first resources by the macro access node and one or more neighboring macro access nodes that are using selected resources from the first resources;

determining an average utilization of the second resources by the one or more pico nodes;

increasing the allocation for the second resources and correspondingly decreasing the allocation for the first resources, responsive to determining that the average utilization of the second resources exceeds the average utilization of the first resources by more than a threshold amount;

increasing the allocation for the first resources and correspondingly decreasing the allocation for the second resources, responsive to determining that the average utilization of the first resources exceeds the average utilization of the second resources by more than a threshold amount; and leaving the allocations for the first and second resources unchanged, responsive to determining that the average utilizations of the first and second resources differ by no more than a threshold amount; and determine the adapted resource pattern to be next applied by the macro access node by adapting the resource pattern based at least in part on the respective allocations.

* * * * *